United States Patent
Dubey et al.

(10) Patent No.: US 10,552,781 B2
(45) Date of Patent: Feb. 4, 2020

(54) TASK TRANSFORMATION RESPONSIVE TO CONFIDENTIALITY ASSESSMENTS

(71) Applicant: Accenture Global Solutions Limited, Dublin (IE)

(72) Inventors: Alpana Dubey, Karnataka (IN); Gurdeep Singh, Karnataka (IN); Kumar Abhinav, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 253 days.

(21) Appl. No.: 15/628,388

(22) Filed: Jun. 20, 2017

(65) Prior Publication Data
US 2018/0114159 A1  Apr. 26, 2018

(30) Foreign Application Priority Data
Oct. 24, 2016  (IN) .............................. 201641036241

(51) Int. Cl.
| | |
|---|---|
| *G06Q 10/00* | (2012.01) |
| *G06Q 10/06* | (2012.01) |
| *G10L 15/19* | (2013.01) |
| *G06F 3/048* | (2013.01) |
| *G06F 15/16* | (2006.01) |

(52) U.S. Cl.
CPC ......... *G06Q 10/0635* (2013.01); *G06F 3/048* (2013.01); *G06F 15/16* (2013.01); *G06Q 10/06311* (2013.01); *G10L 15/19* (2013.01)

(58) Field of Classification Search
None
See application file for complete search history.

(56) References Cited

U.S. PATENT DOCUMENTS

| | | | | |
|---|---|---|---|---|
| 7,200,616 B2* | 4/2007 | Takeuchi | .............. | G06F 21/552 |
| 8,468,244 B2* | 6/2013 | Redlich | ................. | G06Q 10/06 |
| | | | | 709/225 |
| 2005/0193250 A1* | 9/2005 | Takeuchi | .............. | G06F 21/552 |
| | | | | 714/15 |
| 2006/0190391 A1* | 8/2006 | Cullen, III | ............. | G06Q 10/10 |
| | | | | 705/37 |

(Continued)

OTHER PUBLICATIONS

Church, Kenneth Ward, "Word Association Norms, Mutual Information, and Lexicography," Computational Linguistics, vol. 16, No. 1, Mar. 1990, pp. 22-29.

(Continued)

*Primary Examiner* — Gurkanwaljit Singh
(74) *Attorney, Agent, or Firm* — Brinks Gilson & Lione

(57) ABSTRACT

A task transformation architecture meets the technical challenges of geographically distributed task assignment and completion, e.g., by crowd-sourced workers who are external to any given enterprise that needs the task completed. The architecture delivers task information to the workers while maintaining confidentiality. In one aspect, the architecture determines when task descriptions include confidential information, transforms the task to remove the confidential information, and delivers the transformed task to the worker. When the worker responds with a completed project, e.g., source code for executing the transformed task, the architecture transforms the completed project into a form that restores the confidential information.

20 Claims, 18 Drawing Sheets

(56) References Cited

U.S. PATENT DOCUMENTS

2008/0077530 A1* 3/2008 Banas .................... G06Q 10/06
                                                     705/50
2009/0254572 A1* 10/2009 Redlich ................. G06Q 10/06
2010/0280962 A1* 11/2010 Chan ..................... G06Q 10/10
                                                     705/301

OTHER PUBLICATIONS

Margaret Rouse "Gig Economy", http://whatis.techtargetcom/definition/gig-economy, Jun. 8, 2016-Mar. 16, 2017 (6p), last accessed Jun. 20, 2017.

* cited by examiner

Figure 5

Project confidentiality configurationpage

User story 1

As an [account] holder, I want to view all the [accounts] I hold for a [bank] so that I can select the [account] I want to operate on.

Acceptance criteria
- See a list of [accounts]
- Upon clicking [account], see the details of the [account]
- Details shall have information about
  - [Money deposited] along with the date deposited
  - [Money Credited] along with the date [credited]

User story 2

As an [account] holder, I want to view all the [accounts] I hold for a [bank] so that I can select the [account] I want to operate on.

Acceptance criteria
- See a list of [accounts]
- Upon clicking [account], see the details of the [account]
- Details shall have information about
  - [Money deposited] along with the date deposited
  - [Money Credited] along with the date [credited]

Add require...

Select project domain

Financial application ▶

Classify words

| Nouns | Highly Confidential | Moderately Confidential | Not Confidential |
|---|---|---|---|
| Bank | [X] | | |
| List | | | [X] |
| Account | [X] | | |
| Payment | [X] | | |

Save

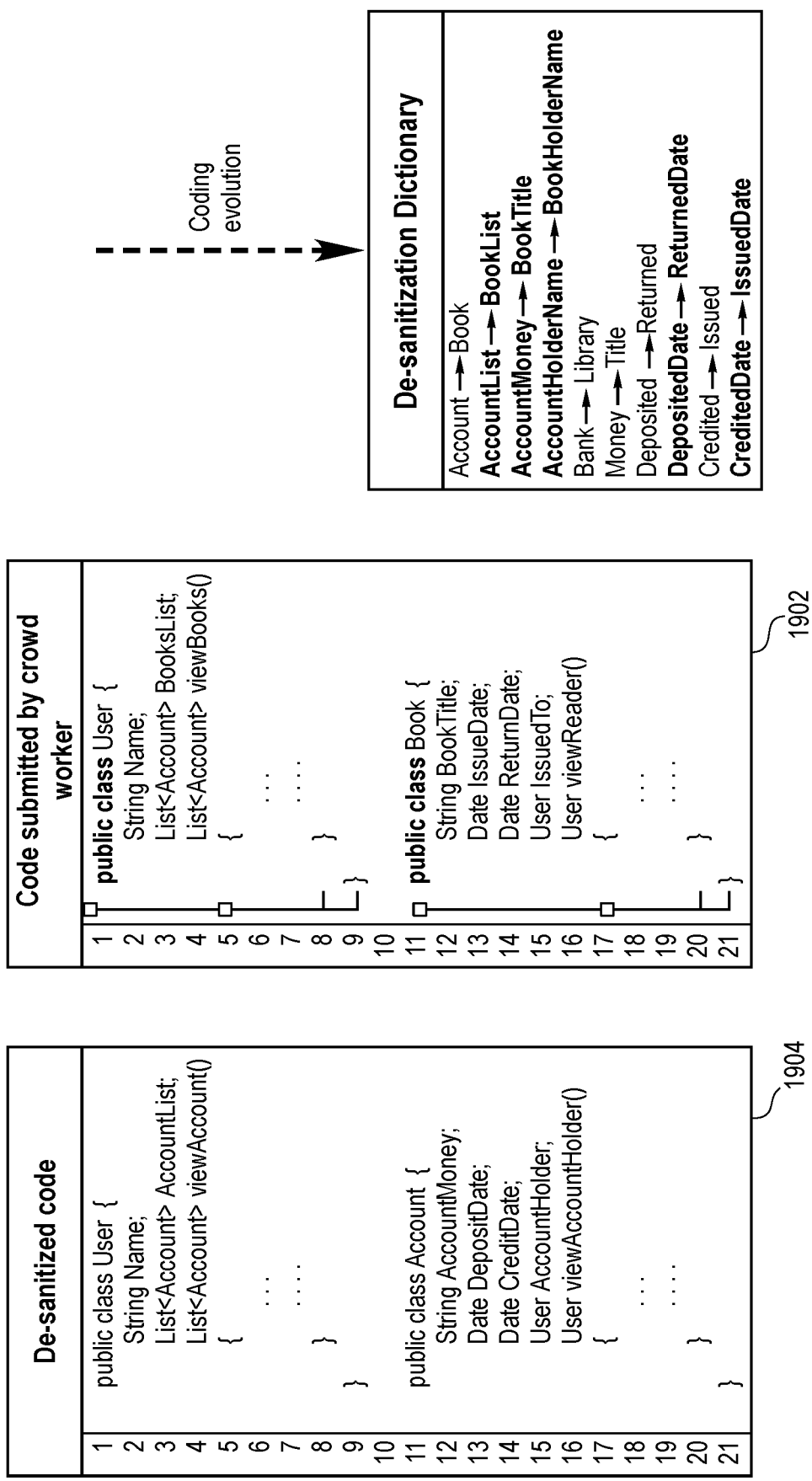

TASK TRANSFORMATION RESPONSIVE TO CONFIDENTIALITY ASSESSMENTS

PRIORITY CLAIM

This application claims priority to Provisional Indian Patent Application No. 201641036241 filed on Oct. 24, 2016, titled "TASK TRANSFORMATION RESPONSIVE TO CONFIDENTIALITY ASSESSMENTS," which is incorporated herein by reference in its entirety.

TECHNICAL FIELD

This disclosure relates to transforming project descriptions, for tasks to be performed, into transformed representations that preserve confidentiality.

BACKGROUND

The global proliferation of high speed communication networks has created unprecedented opportunities for geographically distributed task assignment and task completion, e.g., completion by crowd-sourced workers who are external to any given enterprise that needs the task to be completed. However, while the opportunities exist and continue to grow, the realization of those opportunities has fallen behind. In part, this is due to the enormous technical challenges of determining how to deliver task information to the workers, while maintaining confidentiality.

BRIEF DESCRIPTION OF THE DRAWINGS

FIG. 5 shows an example confidentiality configuration interface.

FIGS. 18 and 19 show an example of transformation processing.

DETAILED DESCRIPTION

A task transformation architecture ("TTA") of an automated user interactive task transformation tool overcomes the technical challenges imposed by geographically or electronically distributing information sensitive task assignments to workers and completion of those tasks, e.g., by crowd-sourced workers who are external to any given enterprise and required to complete the task. The architecture delivers task information to the workers while maintaining confidentiality. In one aspect, the architecture determines when task descriptions include confidential information, transforms the task to remove the confidential information, and delivers the transformed task to the worker. When the worker responds with a completed project, e.g., source code is submitted after executing the transformed task, the architecture transforms the submitted work into a form that restores the confidential information.

Confidentiality is an important consideration for all organizations. Employment agreements provide one mechanism for helping an organization control and maintain the confidentiality of a task, when the task is performed by an internal employee. Information control is more challenging, however, for tasks performed by external workers, e.g., freelance software engineers. In many instances including software development, a task specification often includes a requirements specification, design documents, user interface (UI) designs, user stories, test data, account information, and other data. The architecture described below assesses the confidentiality of a task specification before it is assigned to an external worker. The architecture may determine a risk metric involved with delivering the task to the external worker, and the risk metric may be specific to different types of external work assignments or workers (e.g., different adversary types). The architecture also implements a task transformation system through which a task description can be transformed into a transformed task description that prevents revealing confidential information to the external worker. The TTA executes a transformation process responsive to confidentiality risk measures to reduce the risk of confidentiality loss. To this end, the transformation process may execute different types of operations and the inverse of those operations. The different operations (e.g., information removal and information modification) may be referred to in different ways. As a few examples, the description below and the Figures refer to such operations as information removal, anonymization, sanitization, or obfuscation, with the inverse operations referred to as de-anonymization or de-sanitization, as examples.

Figure 1:
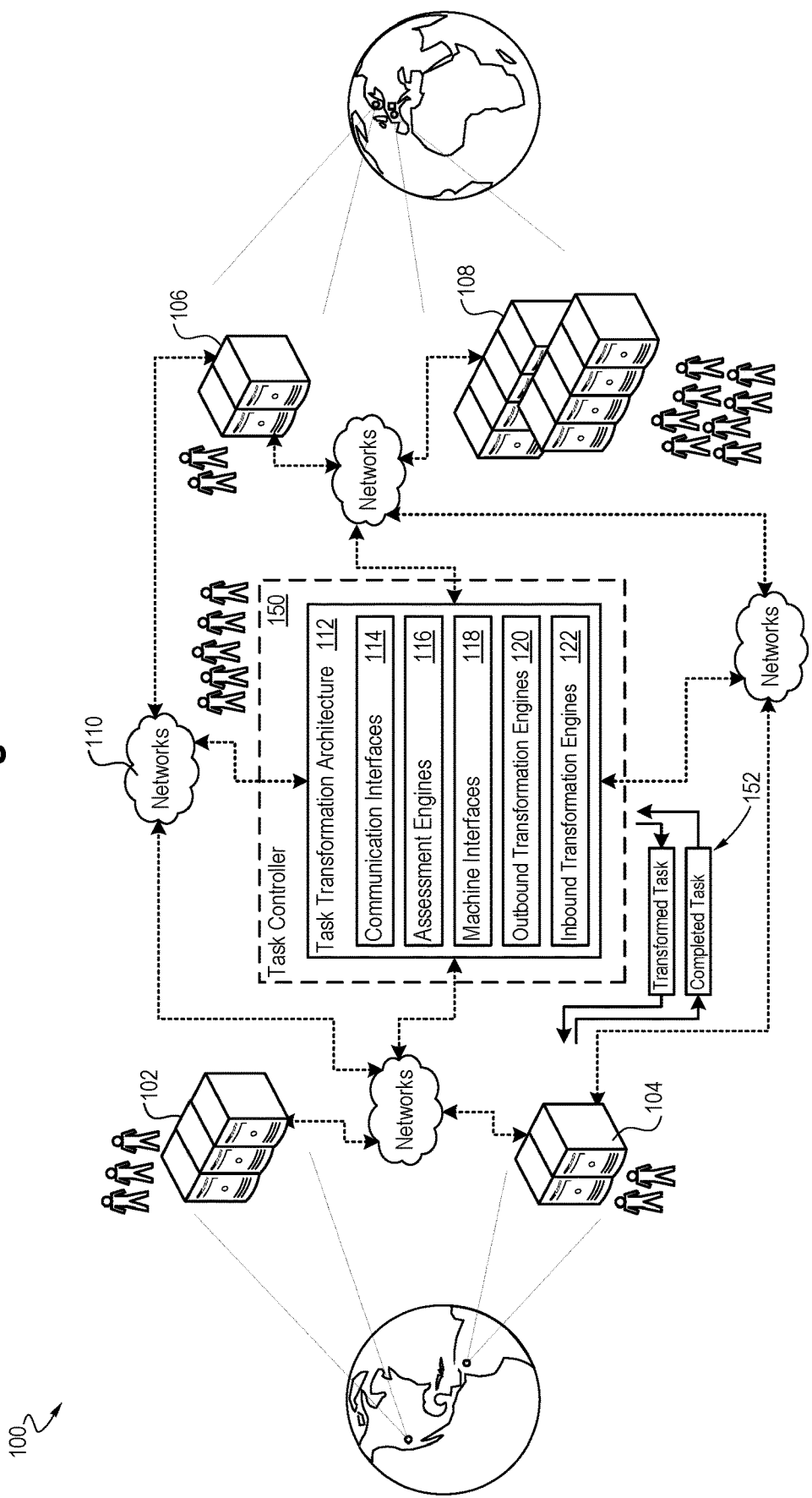
FIG. 1 shows a global network architecture.
Figure 2:
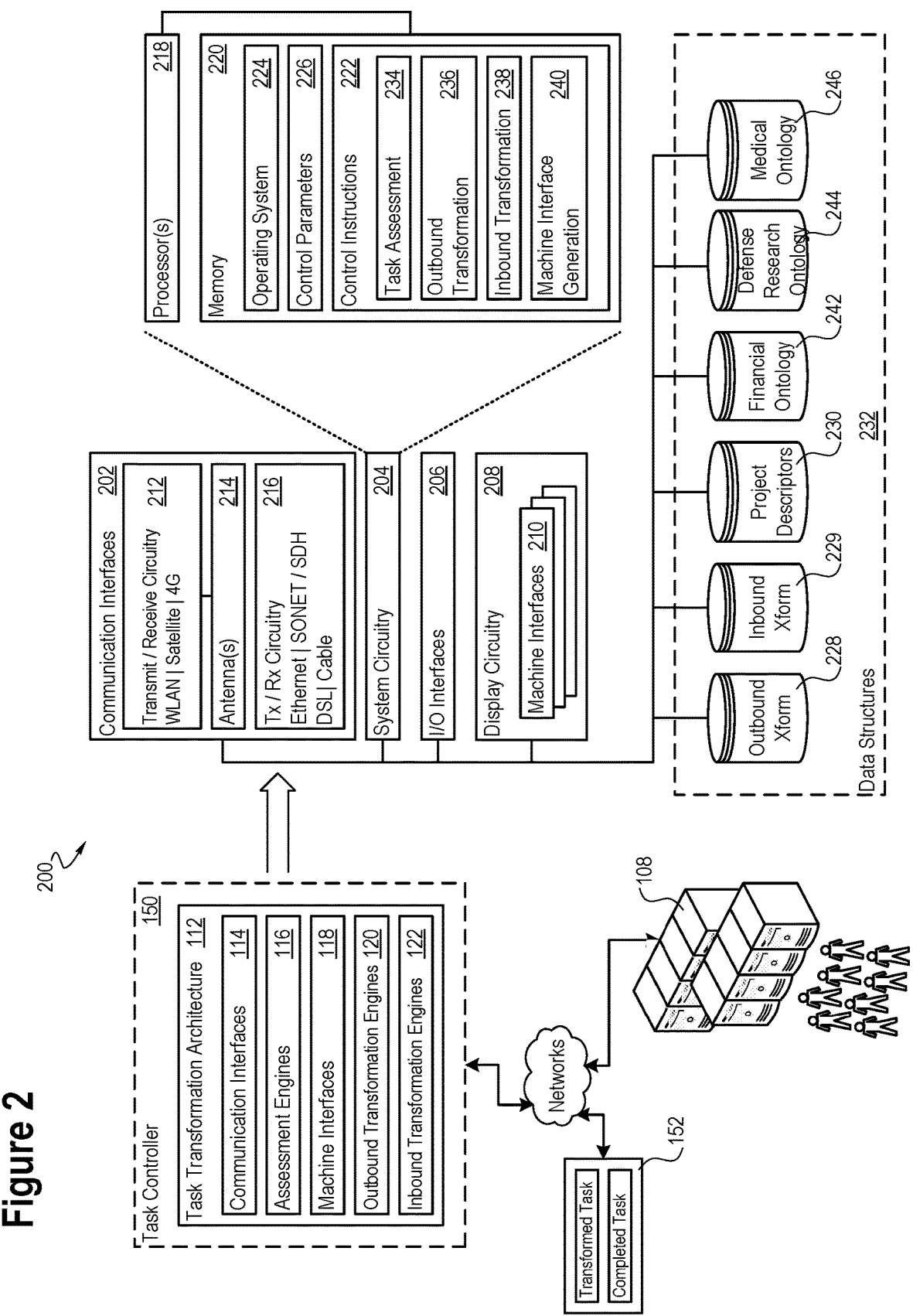
FIG. 2 shows an example implementation of a task transformation architecture.

FIGS. 1 and 2 provide an example context for the discussion below regarding the technical solutions in the TTA. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are geographically distributed data platforms 102, 104, 106, and 108 (102-108). The data platforms 102-108 may represent, for instance, systems associated with external workers who may be retained to execute all or part of a task on behalf of a task controller 150. The task controller 150 may be a system that supports a specific enterprise or organization, for example. The task controller 150 implements a TTA 112.

Throughout the global network architecture 100 are networks, e.g., the networks 110. The networks provide connectivity between the data platforms 102-108 and the TTA 112. The networks 110 may include private and public networks defined over any pre-determined and possibly dynamic internet protocol (IP) address ranges.

The TTA 112 may include communication interfaces 114, assessment engines 116, machine interfaces 118, outbound transformation engines 120, and inbound transformation engines 122. The communication interfaces 114 connect the TTA 112 to the networks 110 and the data platforms 102-108, and facilitate data exchange 152. The data exchange 152 includes transmitting transformed tasks to workers, and receiving completed tasks from the workers. The data exchange 152 also includes the delivery of, and interaction with, machine interfaces (which may include Graphical User Interfaces (GUIs)) for improved interaction with the TTA 112 regarding the task assessment executed by the assessment engines 116, task transformation executed by the outbound transformation engines 120, and the project transformation executed by the inbound transformation engines 122.

FIG. 2 shows an example implementation 200 of the TTA 112. The TTA 112 includes communication interfaces 202, system circuitry 204, input/output (I/O) interfaces 206, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol. However, the communication interfaces 202 are not limited to any specific type of communication technology and any suitable communication technology may be utilized.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the TTA 112, including the assessment engines 116, outbound transformation engines 120, and inbound transformation engines 122. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the TTA 112. The control parameters 226 provide and specify configuration and operating options for the control instructions 222, operating system 224, and other functionality of the TTA 112.

The TTA 112 may include data structures 232 hosted on volume storage devices, e.g., hard disk drives (HDDs) and solid state disk drives (SDDs). The storage devices may define and store database table structures that the control instructions 222 access, e.g., through a database control system, to execute the functionality implemented in the control instructions 222.

The storage devices shown in FIG. 2 may store, for example, ontology data 242, 244 and 246 that may be utilized for risk assessment and task transformation processes. A task description that is processed by the TTA 112 may be configured under a specified domain that may be associated with one or more of the ontologies. The ontologies may include noun, verb or other types of phrases that pertain to any suitable topic, market, business organization, field of interest or industry that may be the subject of a task description, a transformed task and/or a completed task work product. The noun phrases may include a word or a group of words. The ontologies may be based on any suitable subjects, for example, from fields such as medicine, finance, research and development or defense. The ontologies may include names and/or definitions of entity types, properties and interrelationships for a particular domain of discourse. In some systems, the ontology data may be stored in and retrieved from remote memory storage. The TTA 112 system may access ontologies using internal or external ontology services.

The storage devices shown in FIG. 2 may further store a corpus comprising a collection of texts. The corpus may include a body of written or spoken material upon which linguistic analysis may be based. In some embodiments the storage devices may include domain specific information. For example, domain specific information may include language related to a topic or product that is the subject of a user query or comment. The corpus may be utilized in natural language processing by the TTA 112 system. In some systems, the corpus may be stored in and be retrieved from remote memory storage. The TTA 112 system may access corpora using internal or external corpus services.

In the example shown in FIG. 2, the databases store outbound transformation rules and tables 228, inbound transformation rules and tables 229, and project descriptors 230. These are described in more detail below. Any of the databases may be part of a single database structure, and, more generally, may be implemented as data stores logically or physically in many different ways. As examples, the data structures 232 may be executable code, explicitly defined rules, or databases tables storing records that the control instructions 222 read, write, delete, and modify in connection with executing the multi-dimensional processing noted below.

In one implementation, the control instructions 222 include task assessment instructions 234. The task assessment instructions 234 determine to what degree, if any, a task description poses a confidentiality disclosure risk. Outbound transformation instructions 236 convert selected task elements into forms with less disclosure risk, while the inbound transformation instructions 238 convert completed tasks back into a form consistent with the original task elements. For example, the converted completed tasks may include confidential information. The control instructions 222 also include machine interface generation instructions 240 that generate machine interfaces that achieve improved interaction with the TTA 112 regarding the assessments and task transformations.

The data structures 232, task assessment instructions 234, outbound transformation instructions 228, inbound transformation instructions 229, and machine interface generation instructions 240 improve the functioning of the underlying computer hardware itself. That is, these features (among others described below) are specific improvements in the way that the underlying system operates. The improvements facilitate more efficient and accurate delivery of appropriate task details to external workers, with automatic conversion of completed work product into a form consistent with the task description as known internally to task controller 150.

Figure 3:
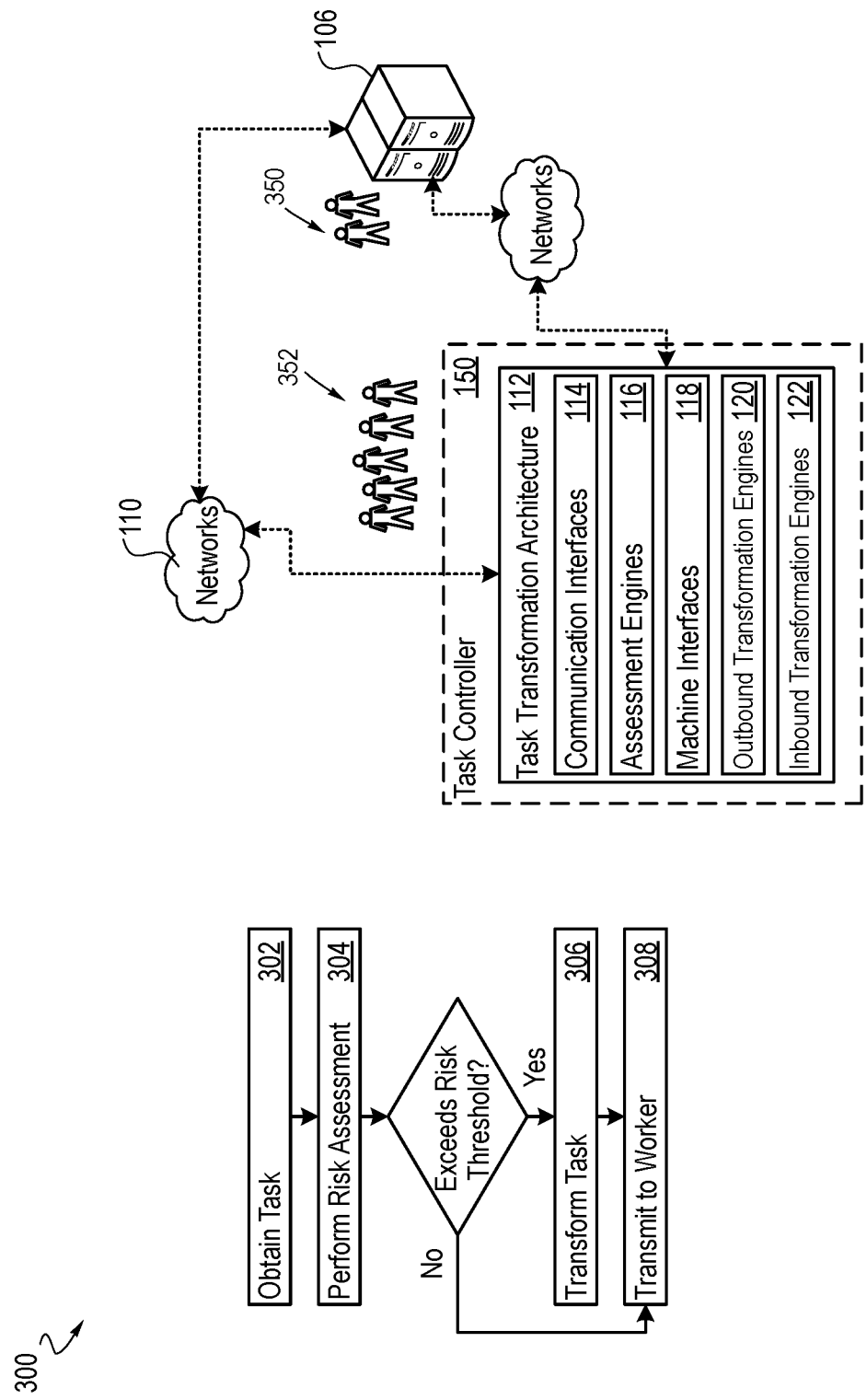
FIG. 3 shows an example of the logic implemented in the task transformation architecture.

FIG. 3 shows an example of the logic 300 implemented in the TTA 112. The TTA 112 obtains a task that may be assigned (302). The TTA 112 may obtain the task from the database that stores project descriptors 230, for instance. Task elements may include written specifications, class diagrams, GUI wireframes, customer data, test data, algorithm types, data types, data structures, verification information, validation information, user names, passwords, places, dates, transaction details, cryptography keys, and other elements. Viewed another way, confidentiality aspects of a task may include, as a few examples, domain information, e.g., characteristics about the task that may be of advantage to a competitor; market information, e.g., information about the enterprise market that could reveal business strategy; task type, e.g., what the task pertains to that reveals project information; personal information, e.g. confidential information such as medical records; and special methods, e.g., a task specifying patent, copyright, trademark, trade secret, of other enterprise proprietary information.

When potential workers include the external workers 350 and/or the internal workers 352, the TTA 112 executes the assessment engines 116 to perform a risk assessment on the task (304). Prior to sending a task to an external worker, and the TTA 112 may determine a risk level metric for a task element and whether the risk level metric exceeds a specified threshold. The specified threshold may be pre-determined or operator specified and stored in memory as a control parameter 226, and it may be static or dynamic in nature. When the risk level metric exceeds the specified threshold, the TTA 112 may transform the task element to obtain a transformed task with a reduced risk level (306) and the TTA 112 may transmit the transformed task to the worker (308). If the risk level of the original task elements cannot be reduced below the threshold, then the TTA 112 may determine to not send the task to the external worker.

Figure 4:
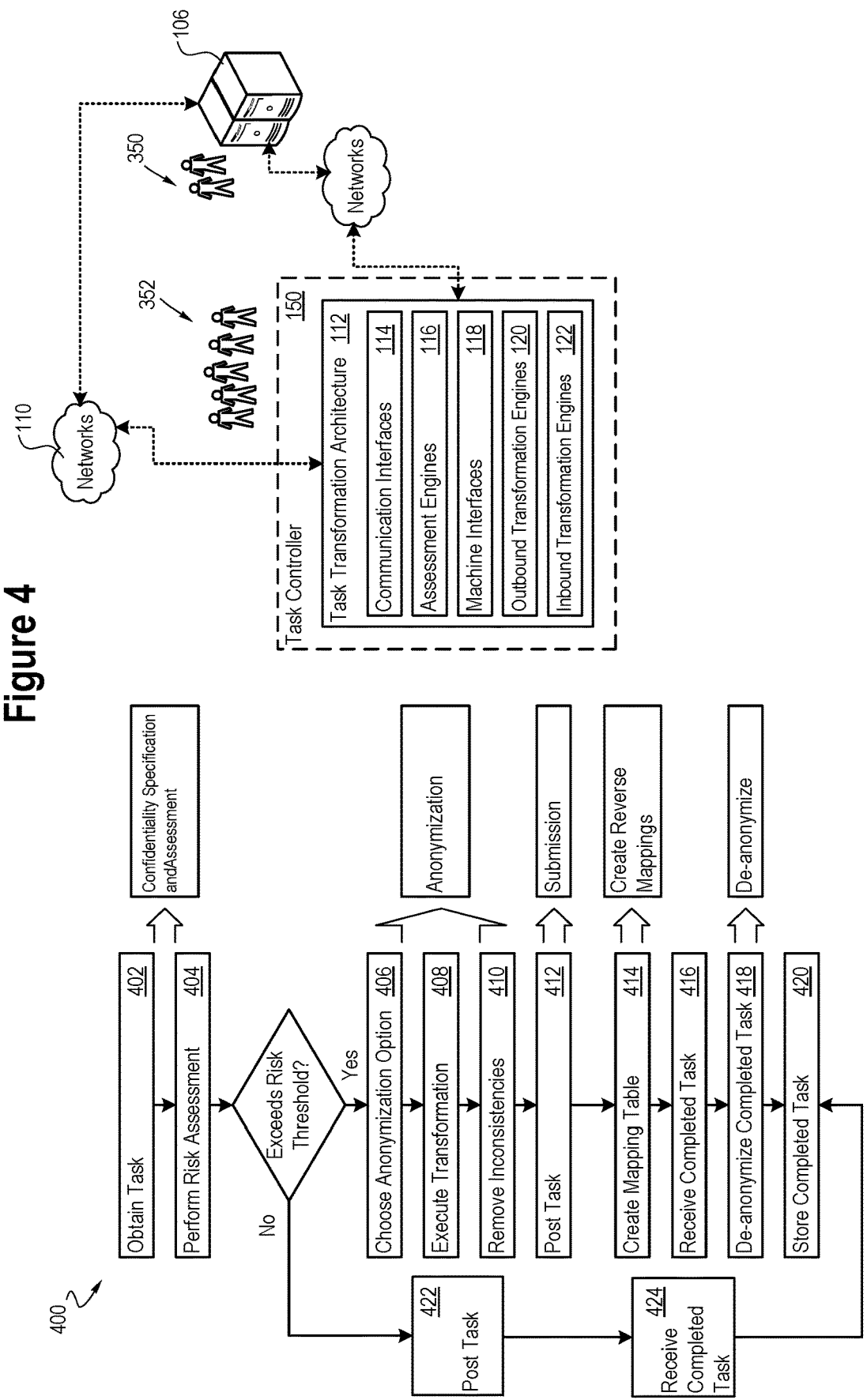
FIG. 4 shows another example of the logic implemented in the task transformation architecture.

FIG. 4 shows an example of logic 400 that may be implemented in the task transformation architecture. The TTA 112 obtains a task (402) that may be assigned to a worker, and executes a risk assessment operation on the task (404). With regard to transforming task elements that exceed the risk level threshold, the TTA 112 or an operator may choose from multiple pre-defined anonymization algorithms (406). The TTA 112 executes the chosen anonymization algorithm and transforms the task elements to reduce or eliminate the confidential information (408). The TTA 112 may then remove inconsistencies (410) and may otherwise prepare a transformed task.

The TTA 112 may then post the transformed task (412) for access by users who may perform or complete a project based on the transformed task. For instance, the TTA 112 may transmit the transformed task to an internal or external host for task postings. Examples of such external hosts are GitHub, Upwork, Dibble, and Elance. Each transformation of a task or task element may be captured in a mapping table (414). The mapping table may provide a ruleset to the TTA 112 for translating a task to an anonymized form for posting, for example, according to a selected task transformation algorithm. In one example, the term "account number" may be replaced with the term "library card number". When the TTA 112 receives completed tasks or work products (416), the TTA 112 may apply the mapping table to de-anonymize the completed tasks (418) so that they correspond to the task as originally specified. For example, the term "library card number" may be replaced with the term "account number." In other implementations, the TTA 112 may execute, e.g., an natural language processing (NLP) engine to perform replacement at other levels of granularity. For instance, the TTA 112 may replace an entire sentence that includes the term, rather than only replacing individual terms or phrases.

FIG. 5 shows an example of a confidentiality configuration interface 500. The interface 500 may be rendered as any suitable graphical user interface, e.g., as a web page displayed in a web browser. In one implementation, an operator or the TTA 112 may configure details for a project or task. In one example, the task may specify how to write code for a software application based on a set of requirements, however, the task is not limited in this regard. The operator may select or enter in the interface 500 configuration parameters such as a project domain for the task or application, a type of the task or application, a market the task or application applies to, and special methods used (e.g., trade secret processes). The interface 500 may display task elements, for example, application requirements or a user story for the application. The operator may select keywords from the displayed task elements and may classify the keywords according to a confidentiality scale, e.g., as confidential, non-confidential or moderately confidential. In one example, as shown in FIG. 5 the keywords "account," "money" and "bank" are identified as highly confidential. The operator may then save the confidentiality configuration for the project. Note that in some implementations, the system may identify the sensitivity of some or all of the terms in other ways, e.g., by reference to a pre-defined domain ontology that identifies sensitive terms. The task or task elements may be referred to as being original or configured prior to executing a transformation process by the TTA 112.

Figure 6:
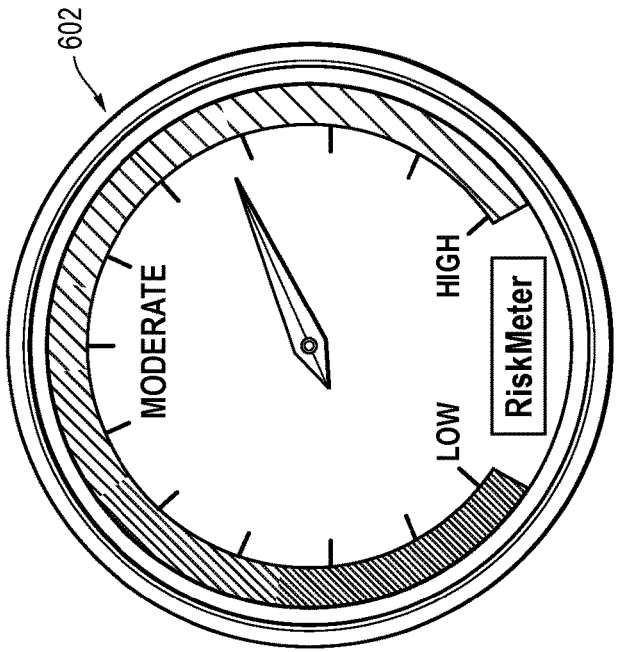
FIG. 6 shows an example confidentiality risk assessment.

FIG. 6 shows an example confidentiality risk assessment interface 600 for the originally specified task configuration shown in FIG. 5. The interface 600 may be a user interface that may be rendered as any suitable graphical user interface, e.g., as a web page displayed in a web browser. In this example, the interface 600 displays the original task elements (task elements prior to transformation) and highlights the keywords that have been configured and/or classified as sensitive by the system. In some systems, the highlighting may indicate the confidentiality classifications of the keywords. The TTA 112 may determine a risk assessment metric for the original task, and may generate a risk assessment reporting element 602 that visually conveys the risk assessment metric of the original task to the operator. In one regard, the TTA 112 may assess risk and determine a confidentiality risk metric in response to the operator selecting a task and instructing the TTA 112 to calculate the risk metric for the task, for example, by selecting an icon in the interface 600. The risk assessment reporting element 602 visualizes the risk assessment metric and thereby informs the operator of the chances of confidential information being leaked, e.g., the probability of an entity or user guessing the original configured task domain correctly.

Figure 7:
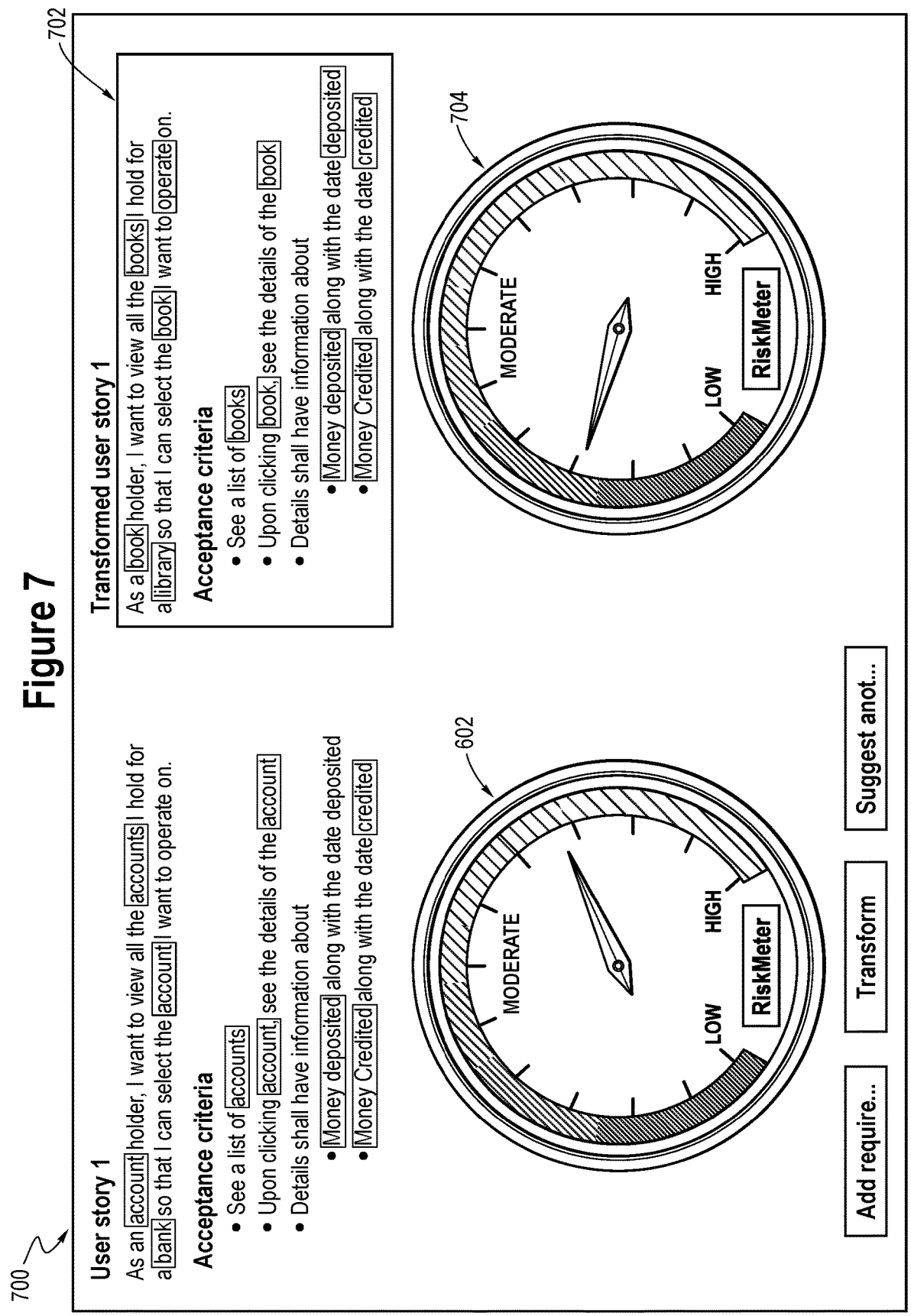
FIG. 7 shows an example confidentiality risk assessment for a task transformation process.

FIG. 7 shows an example of a confidentiality risk assessment interface 700 for a task transformation process. The interface 700 may be rendered as any suitable graphical user interface, e.g., as a web page displayed in a web browser. Referring to FIG. 7 the interface 700 may display the original task requirements and may highlight the sensitive keywords. The highlighting may indicate the status of the keywords, for example, as low, moderate or highly confidential and the like. The operator may select an anonymization option or algorithm to be utilized for transforming the original task requirements to an anonymized version of the task requirements. In some embodiments, the anonymization option or algorithm may be configured by an operator in the TTA 112. Examples of anonymization options include: renaming or replacing a word with terminology from another domain, generalizing a word or words, and suppressing a description of a special or confidential algorithm or replacing it with a publically known algorithm. The operator may select an icon in the interface 700 to initiate the transformation process. The interface 700 may then display the resulting transformed task requirements 702 with highlighted transformed keywords, along with an updated reporting element 704 indicating a lower risk assessment for the transformed results, for example, for replacing the term "account" with the term "book."

Figure 8:
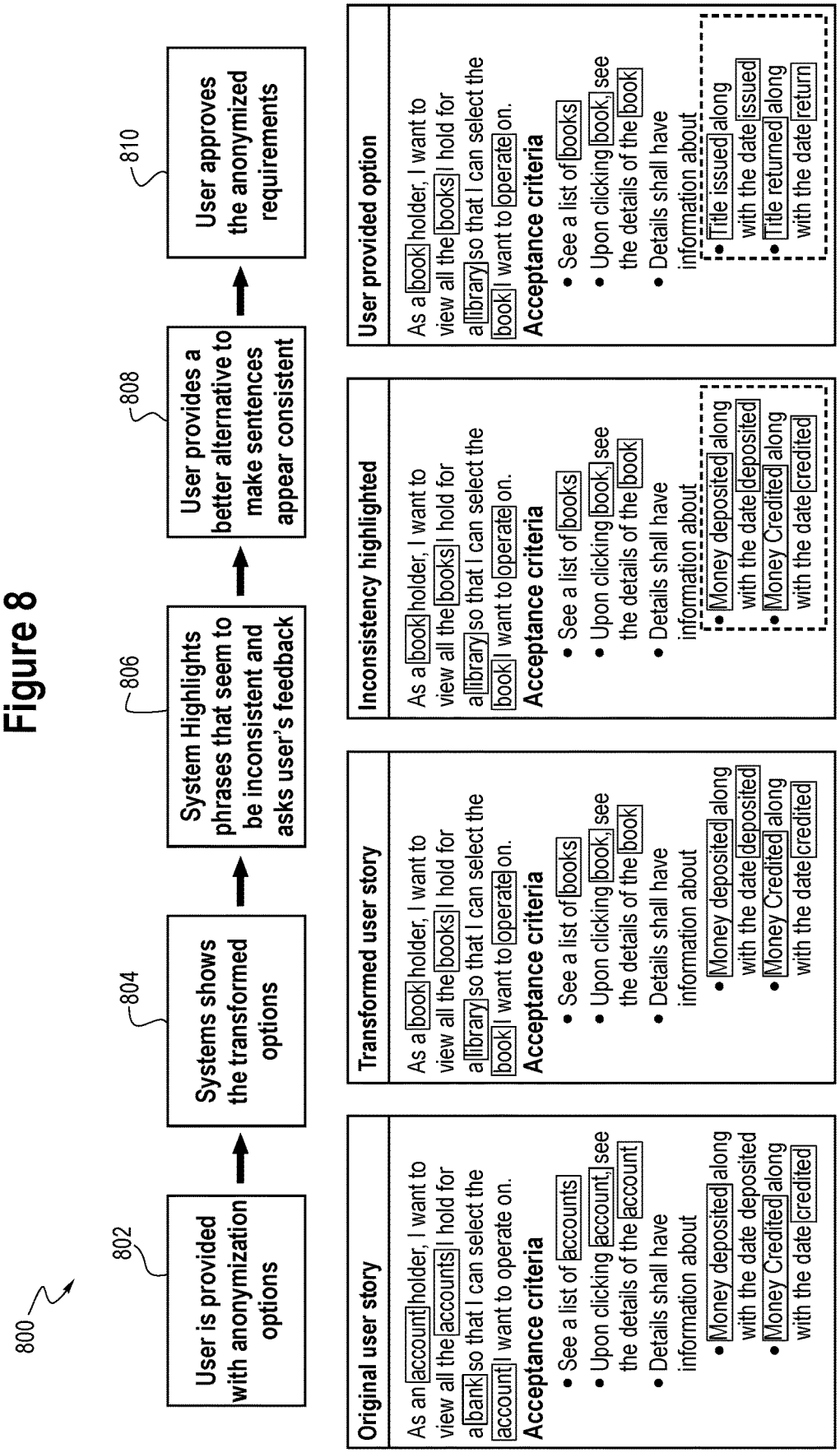
FIG. 8 shows an example of transforming textual requirements from one domain to another.

FIG. 8 shows an example of logic that the TTA 112 may implement for transforming textual requirements of a task from one domain to another domain. The TTA 112 may provide an operator with anonymization options (802), for example, the original task requirements of the original domain may be displayed with highlighted sensitive keywords. The TTA 112 may generate user interface elements that show transformed task options (804), for example, showing the task as transformed by the TTA 112 into a new domain and/or to obscure the sensitive keywords. The TTA 112 may highlight words and phrases in the transformed task that the TTA 112 determines to be inconsistent within the context of other terms in the transformed task, and may prompt operator feedback (806) with respect to the inconsistencies. In this example, the words "money" and "deposited" are identified as inconsistent within the domain of the transformed task and/or with substitution of the term "book" for "account." The TTA 112 may accept input from the operator via the user interface to identify better or alternative word or phrase substitution to make the words and phrases more consistent (808) within the transformed task requirements. The TTA 112 may accept operator input for approval of the anonymized task elements with or within an alternative entered (810).

Figure 9:
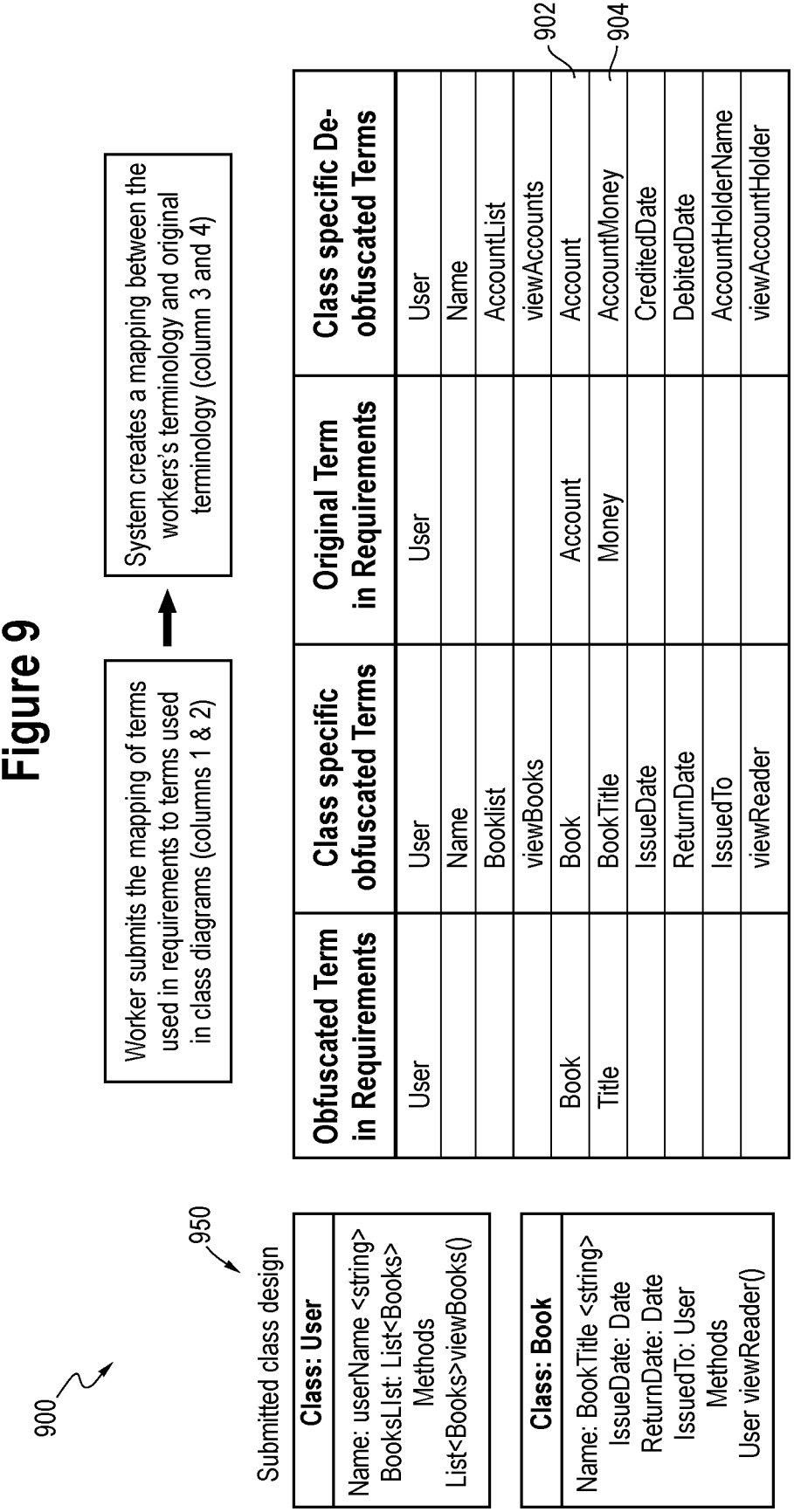
FIG. 9 shows an example of a mapping table.

FIG. 9 shows an example of a mapping table 900. The TTA 112 may create a transformation knowledgebase. In one aspect, the knowledgebase links class diagram entities with the task elements to create the mapping table 900. The TTA 112 also applies the mapping table 900 to transform a domain or terminology of a completed task or work product 950 back to the original domain or terminology of the original task, e.g., for original task elements that were design documents, UI design specifications, or code requirements. In FIG. 9, the mapping table 900 captures transformation rules applicable to the classes designed and specified in the completed task 950. One example transformation rule is the transformation rule 902 that specifies to replace the word "Account" with the word "Book". Another example transformation rule 904 specifies to replace the term "Account-Money" with "BookTitle" and "Money" with "Title." As noted above, the TTA 112 may execute replacement at other levels of granularity, e.g., phrase or sentence level replacement.

Figure 10:
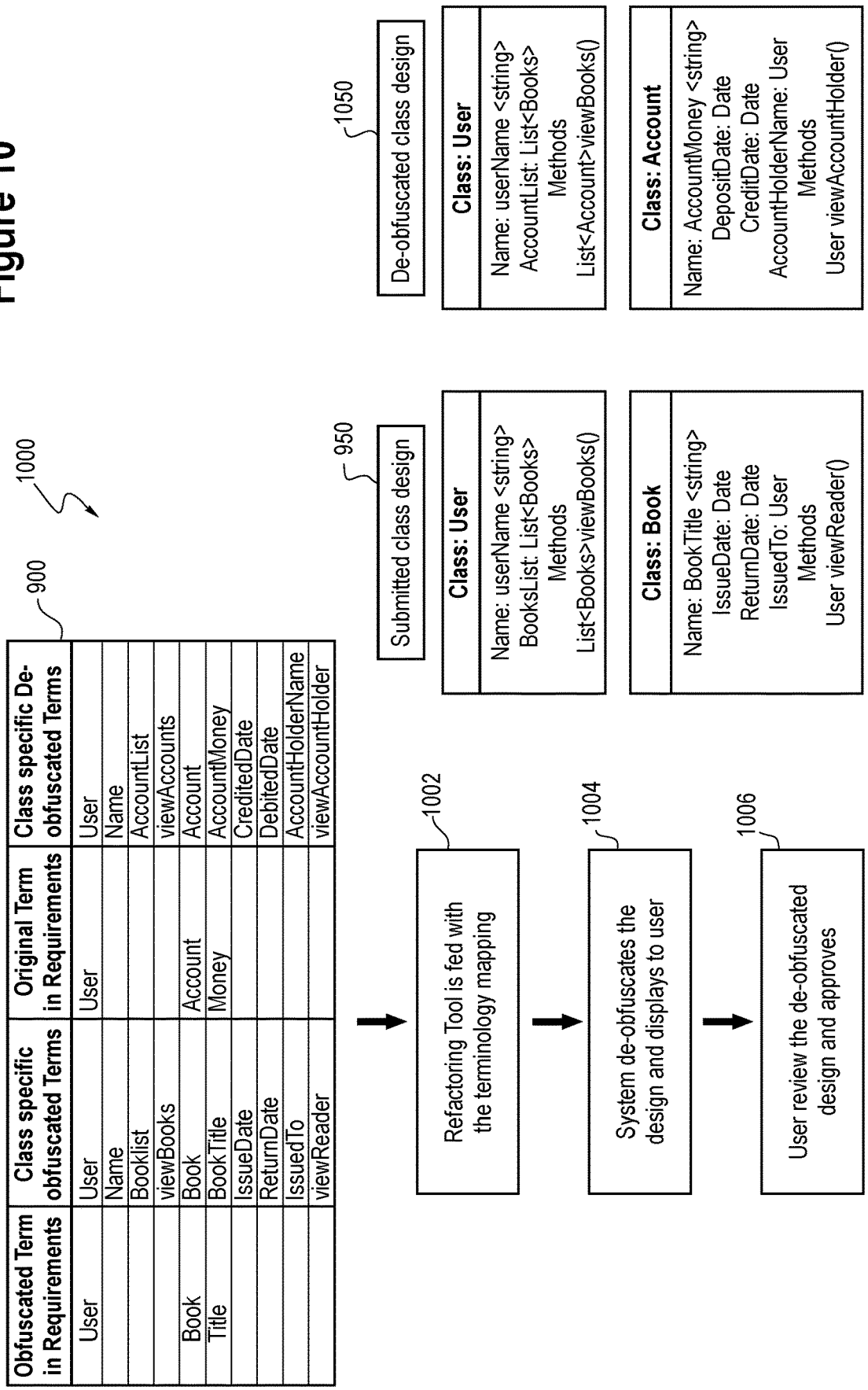
FIG. 10 shows an example of logic for reverting back to the terminology in the original task elements.

FIG. 10 shows an example of logic 1000 for the inbound transformation engine 122 used for reverting a completed task 950 to include the terminology of the original task elements in order to obtain a de-anonymized completed task or work product 1050. The particular example shown in FIG. 10 is for a design document task element. The TTA 112 applies the mapping table 900 by, e.g., providing the mapping table 900 as an input to a refactoring tool (1002). The TTA 112 executes the refactoring tool to de-anonymize the completed task 950 and displays the refactored output to the operator (1004). The operator may then review, edit, and approve of the refactored output (1006).

Figure 11:
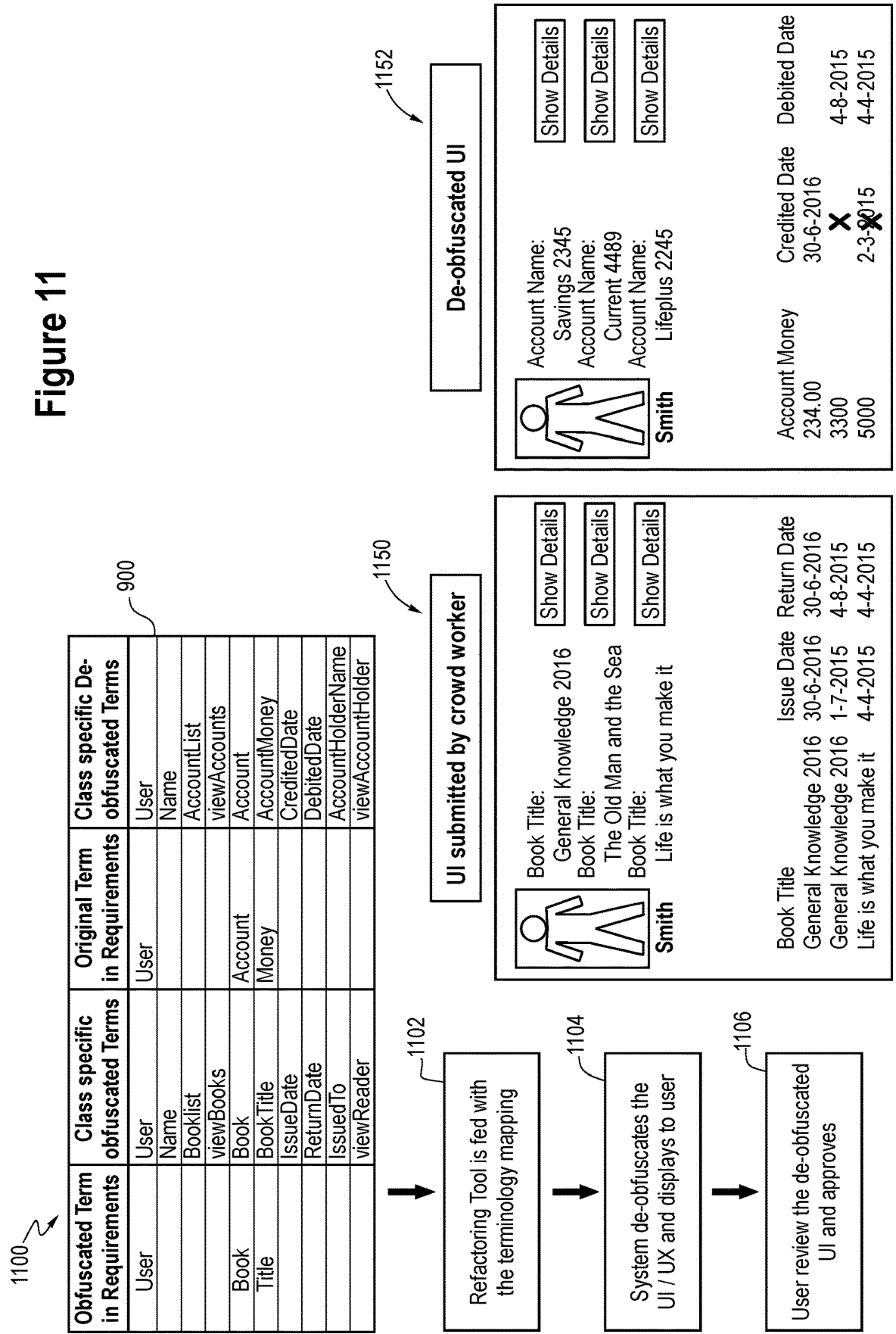
FIG. 11 shows an example of logic for reverting back to the terminology in the original task elements.

FIG. 11 shows an example of logic 1100 for the inbound transformation engine 122 for reverting a user interface task element from a completed task 1150 to obtain a de-anonymized completed task or work product 1152. The TTA 112 applies the mapping table 900 by, e.g., providing the mapping table 900 as an input to a refactoring tool (1102). The TTA 112 executes the refactoring tool to de-anonymize the completed task 1150 and displays the refactored output to the operator (1104). The operator may then review, edit, and approve of the refactored output (1106).

Figure 12:
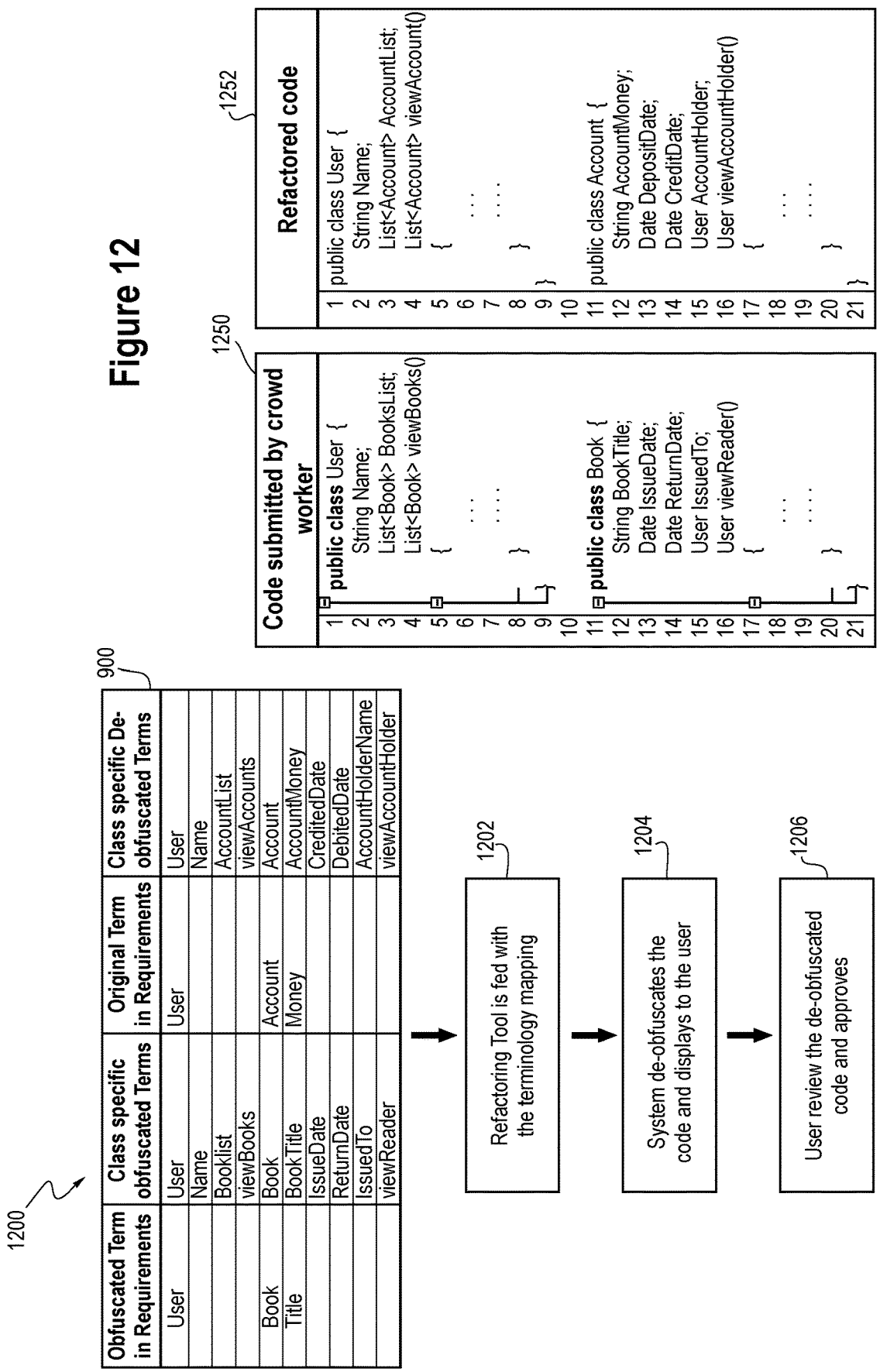
FIG. 12 shows an example of logic for reverting back to the terminology in the original task elements.

FIG. 12 shows an example of logic 1200 for the inbound transformation engine 122 for reverting a program code task element from a completed task 1250 to obtain a de-anonymized completed task or work product 1252. The TTA 112 applies the mapping table 900 by, e.g., providing the mapping table 900 as an input to a refactoring tool (1202). The TTA 112 executes the refactoring tool to de-anonymize the completed task 1250 and displays the refactored output to the operator (1204). The operator may then review, edit, and approve of the refactored output (1206).

In some implementations, the TTA 112 includes a software terminology repository creation circuitry. This circuitry creates and maintains a repository of terminologies (e.g., in the data structures 232) used in various domains. The TTA 112 uses the repository to assess the probability of confidentiality loss or leakage of sensitive information. The repository may include words used by different software systems, with software classified based on type, domain, and non-functional traits (e.g., real time, asynchronous messaging, and the like). As a few examples, the software domain Financial may have a software type of Real Time, with characterizing words: stock market, share prices, securities, and the like; the software domain Education may have a software type of Information System, with characterizing words: student, teacher, fees, courses, syllabus, and the like; and the software domain Chat Messenger may have a software type of Real Time, with characterizing words: participant, message, chat text, emoticons, and the like.

Note that with regard to risk assessment, the assessment engines 116 in the TTA 112 may assess risk from written text, diagrams, and other task elements. The assessment engines 116 may execute the following steps to determine the risk metric: parse the requirements document; in case of visual artifacts, fetch the words from the visual artifact; pre-process the words, for example a class diagram may have used a shortened name that the TTA 112 expands to full form; remove stop words; perform topic modeling by applying the software repository; and determining the topic and the risk metric, and displaying the results to the operator. Visual artifacts can also be icons strongly associating to a particular domain. Such icons will also be de-anonymized or replaced with different icon.

Figure 13:
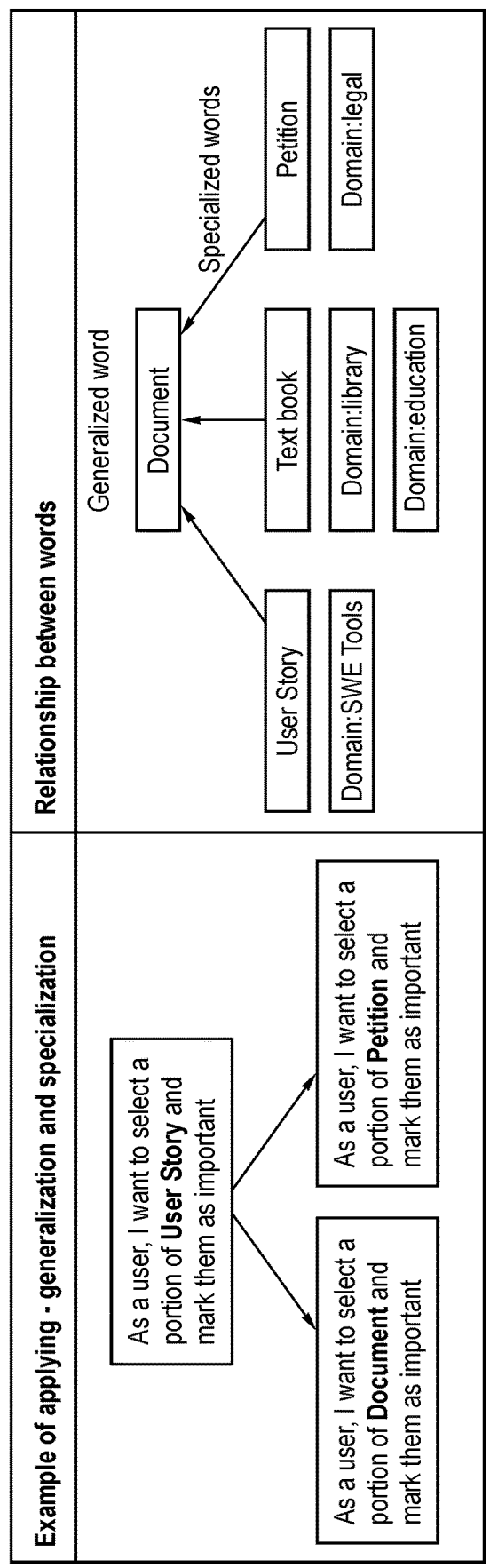
FIG. 13 shows an example of logic for requirements transformation.

FIG. 13 shows an example of logic 1300 for requirements transformation. In the example of FIG. 13, the outbound transformation engine 120 transforms task elements to reduce risk levels. The logic 1300 identifies words to be anonymized in the task element and searches for a replacement word. In that regard, the logic 1300 may: apply generalization to search for a generic word in the repository, for example, to determine a generic word for "story" or "text book" such as "document" and make the replacement; and apply specialization to find a generic word, then search for specialized words that belong to a different domain based on the generic word to find another domain. In other words, specialized words from multiple domains may be associated with the same generic term and may be used to find a target domain ontology for transforming or anonymizing a task.

Figure 14:
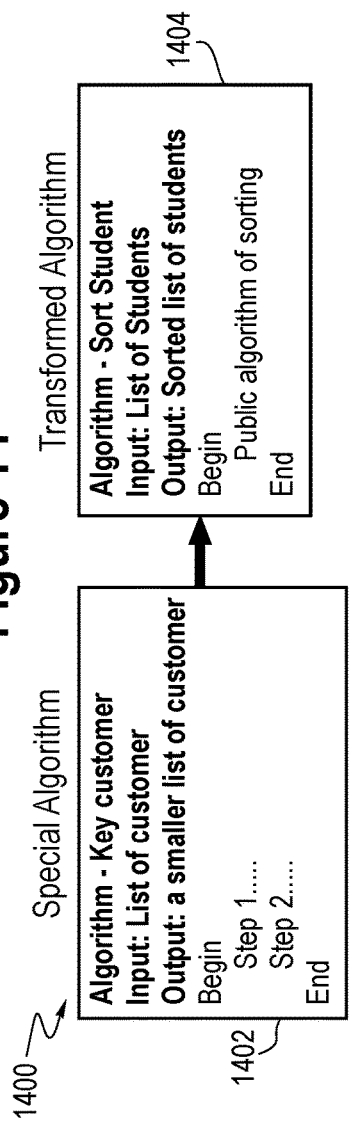
FIG. 14 shows an example of logic for transforming confidential algorithms.

FIG. 14 shows an example of logic 1400 for transforming confidential algorithms, e.g. from a source algorithm 1402 to a transformed algorithm 1404. In this regard, the TTA 112 may implement the following steps: obtain from the task specification the task element specifying an algorithm which should be treated as confidential; determine a signature of the algorithm, such as the set of input parameters and expected output data; search for a placeholder algorithm that has inputs and outputs that are similar or match in structure, type, number, form, or any combination of those characteristics relative to the signature; and transform the task element by replacing the algorithm in the task specification with the placeholder algorithm.

Figure 15:
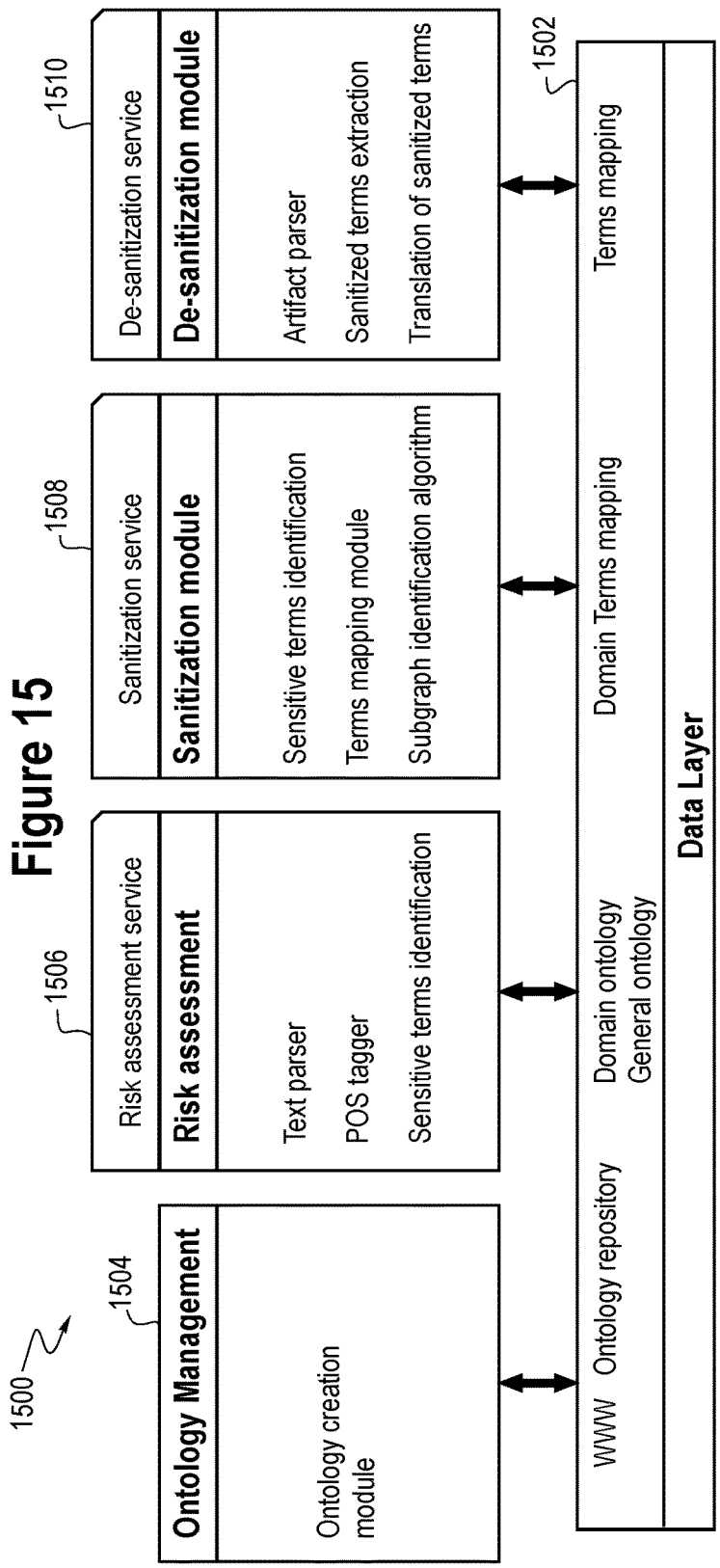
FIG. 15 shows another example implementation for the task transformation architecture.

FIG. 15 shows an example implementation 1500 for a TTA 112. In the example shown in FIG. 15, the TTA architecture implements a connected data layer 1502. The data layer 1502 provides data exchange among multiple services, including an ontology service 1504, a risk assessment service 1506, an outbound transformation service 1508, and an inbound transformation service 1510. The ontology service 1504 establishes, defines, and maintains ontology models for the expected task domains. The risk assessment service 1506 implements, as an example, a text parser, a part-of-speech tagger, and an identification module for identifying sensitive terms. The outbound transformation service 1508 may implement identification of sensitive terms, term substitution mapping, and subgraph identification in task or task assignment data. The inbound transformation service 1510 may processes an artifact, for example, a completed task or work product data, and may implement an artifact parser, a transformed term extractor, and/or a term translator to return or transform the completed task to the domain of the originally specified task.

With regard to risk assessment for the original task data, the TTA 112 may implement logic that include detection of sensitive terms and determination of risk scores responsive to the detected sensitive terms. In one implementation, the TTA 112 searches for and locates terms that are noun phrases (NPs) to determine the presence of sensitive data. To detect NPs, the TTA 112 applies natural language processing (NLP) tools (e.g., Open NLP, and Natural Language Tool Kit (NLTK)) and may implement the following steps to determine sensitive terms:

Algorithm: Sensitive Terms Detection
Input: Artifact (text, diagram with text)
Output: Sensitive terms
Processing:
1) Parse task element to extract words, which may include removing stop words and stemmization;
2) Tag each word with Part-of-speech (POS)
3) Execute syntactic parsing of POS tagged tokens to detect NPs;
4) For each noun phrase t do
   4a) If t is already present in the domain ontology, tag the noun phrase t as a sensitive term ($t_s$)
   4b) Else compute the information content (IC) of t (e.g. the information revealed by the term t). The Web may be used as a corpus for both sensitive terms and other NPs which are not present in a domain ontology, according to:

$$IC(t) = -\log_p(t) \qquad \text{Equation 1}$$

Where p(t) may represent the probability of occurrence of a noun phrase t or a term, for example, in a web page or a document. In one embodiment, p(t) may be determined based on the number of web pages that are returned from Web searches, which include the noun phrase t relative to the number of web pages returned that do not include the noun phrase t. However, the disclosure is not limited to any specific method of determining the probability p(t) and any suitable method may be utilized.

5) Consider a threshold as the least IC value of the sensitive terms:

$$\tau = \min(IC(t_s)) \qquad \text{Equation 2}$$

6) If the IC value of a NP that is not in the domain ontology is above a threshold, tag the NP as a sensitive term ($t_s$)
7) Find the correlation between each sensitive term relative to each non-sensitive term using pointwise mutual information (PMI):

$$PMI(t_s, t_{ns}) = IC(t_s) - IC(t_s \mid t_{ns}) \qquad \text{Equation 3}$$

$$PMI(t_s, t_{ns}) = \frac{p(t_s, t_{ns})}{p(t_s) \cdot p(t_{ns})}$$

8) If the IC value (PMI) is greater than the threshold, tag the terms as sensitive ($t_s$).

The TTA 112 may implement the following steps to determine a risk metric:
Algorithm: Calculate Risk
Input: Artifact (text, diagram with text)
Output: Risk
Processing:
1) Find sensitive terms $T_s = (t_{s1}, t_{s2}, \ldots t_{sn})$ in the task element
2) Calculate risk factor for the artifact as $$RiskFactor = \frac{1}{N} \sum_{\forall t_s \in T_s} p(t_s) \cdot \log(p(t_s)) \qquad \text{Equation 4}$$

where $T_s$ the set of sensitive teens and N is total number of sensitive terms

The TTA 112 may implement the following steps to transform task elements by replacing sensitive terms:
Algorithm: Sanitize Artifact
Input: Artifact (text, diagram with text)
Output: Sanitized Artifact
Processing:
1) Identify sensitive terms in the artifact
2) Find a replacement term rt for each sensitive term st using one of the following operations
   2a) Find a Replacement Different Domain (st, SD, DD)
       SD: Source domain, DD: Destination domain
   2b) Find a Generalized Term (st, SD)
3) Replace st with rt The TTA 112 may implement the following steps to transform task elements by replacing a domain:
  Algorithm: Find Replacement Different Domain
  Input: Term t, Source Domain (SD) Destination Domain (DD)
  Output: Replacement term
  Processing:
  1) Find a source subgraph SG containing term t and other sensitive terms in source ontology
  2) Find a destination subgraph DG matching SG in the destination ontology
  3) Find the term dt in Destination domain subgraph DG which is equivalent to t in SG
  4) Return dt The TTA 112 may implement the following steps to transform task elements by generalizing terms:
  Algorithm: Find Generalized Term
  Input: Term t, Source Domain
  Output: Replacement term
  Processing:
  1) Find a generic term dt in the Source domain ontology
  2) Return dt With regard to creating the mapping table of mapping terms that may be used to transform in either of the outbound or inbound directions, it is noted that the completed task or work product may include elements that include new terms to map back to the original domain. With regard to mapping terms, the TTA 112 may implement the following steps:
  Algorithm: Term Mapping
  Input: Terms in submitted artifacts
  Output: "De-sanitization dictionary" that contains mapping of sanitized terms to terms used in a de-sanitized domain
  Processing:
  1) For each term t
    1a) If dictionary does not contain a mapping of t to original domain
    1b) Identify substrings of t=t1t2t3 . . . tn
    1c) If the substring ts is present in the mapping
      1c1) Let dts be a de-sanitized term of ts
      1c2) Create a new term mapping for t as t1t2 . . . ts . . . tn in the de-sanitization dictionary
    1d) Else
      1d1) Check for a semantically related term dt for t in the document
      1d2) Create a mapping for t as dt in the de-sanitization dictionary To transform received completed task elements or work product back to the original domain, the TTA 112 may implement the following steps:
  Algorithm: De-sanitization
  Input: Artifact
  Output: De-sanitized artifact
  Processing:
  1) For each term t in the submitted artifact
    1a) Find a mapping dts in the de-sanitization dictionary
    1b) Replace is with dts Expressed another way, the TTA 112 implements confidentiality protection to reduce the probability of identifying confidential information. For instance, anonymization of personal identity is a confidentiality protection mechanism used to protect the personal data of individuals. Quite often, anonymization alone does not work as the other personal details together can be used to identify a person. Therefore the TTA 112 implements a confidentiality protection mechanism that addresses the mutually correlated information. The TTA 112 identifies terms that assist in inferring the confidential information, and flags those terms as sensitive terms. The process of replacing a sensitive term with a non-sensitive term is transformation.

Figure 16:
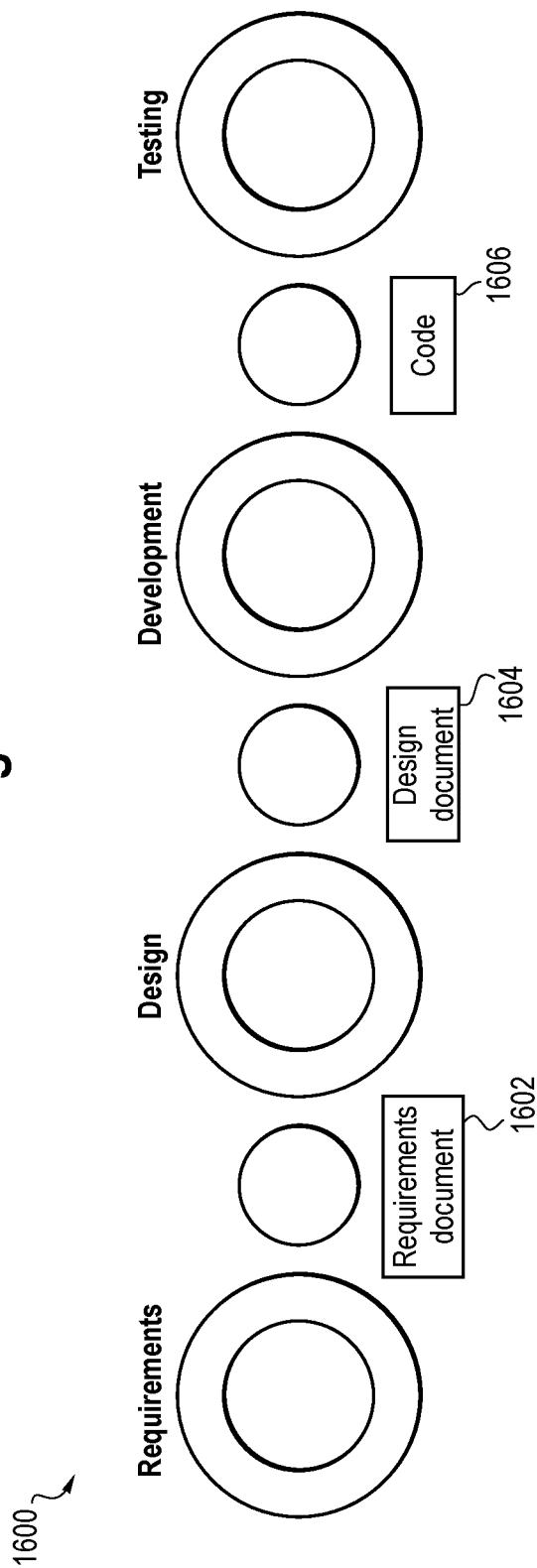
FIG. 16 shows example software development artifacts.

In software development in particular, the software development process may include phases, for example, requirements, design, development, and testing. Each phase may specify or consume a set of task elements (which may be referred to as artifacts) and produces another set of artifacts as a result of performing or completing a task. FIG. 16 shows several example artifacts 1600: the requirements document 1602, the design document 1604, and the code 1606.

In more detail, the design phase may consume the requirements document 1602 that may specify user stories, and may produce or output the design documents 1604 that may contain Unified Modeling Language (UML) diagrams. Each phase may be divided into several tasks that may be assigned to project team members. For instance, requirements may be broken down into user stories and each user story may be independently assigned to a worker. Sensitive information may be revealed through task descriptions and artifacts shared with the worker in the software development phase. For instance, a developer might need access to class designs and respective user stories to implement code for a method. Sensitive information may appear in the form of terms used in the design document 1604, class names, variable names, test scenarios, user experience (UX) elements, and the like. An external worker with malicious intent could analyze any of these artifacts to infer confidential business knowledge or business strategy. Some of the business critical information may include an application domain of software that is being built, a type of software, proprietary algorithms, or client information. The presence of terms that strongly correlate with any of the above mentioned information could provide hackers with clues to infer the organization's upcoming products or future business focus.

The produced artifacts may contain sensitive terms either in their original form or in the transformed form. In some instances, the transformed sensitive terms may be shortened, concatenated with non-sensitive terms, or replaced with similar terms by the TTA 112. For instance, consider a software design task whose input includes requirements, captured in the form user stories and the output is a class diagram. The class diagram would have additional fields to fully define the entities described in the requirements. New terms introduced in the additional fields may be transformed using a pre-defined transformation process on sensitive terms, e.g., to conform to agreed-upon naming conventions and facilitate readability of a generated artifact. Hence, the TTA 112 may apply heuristic based approaches to detect the sensitive terms in the output artifacts.

Figure 17:
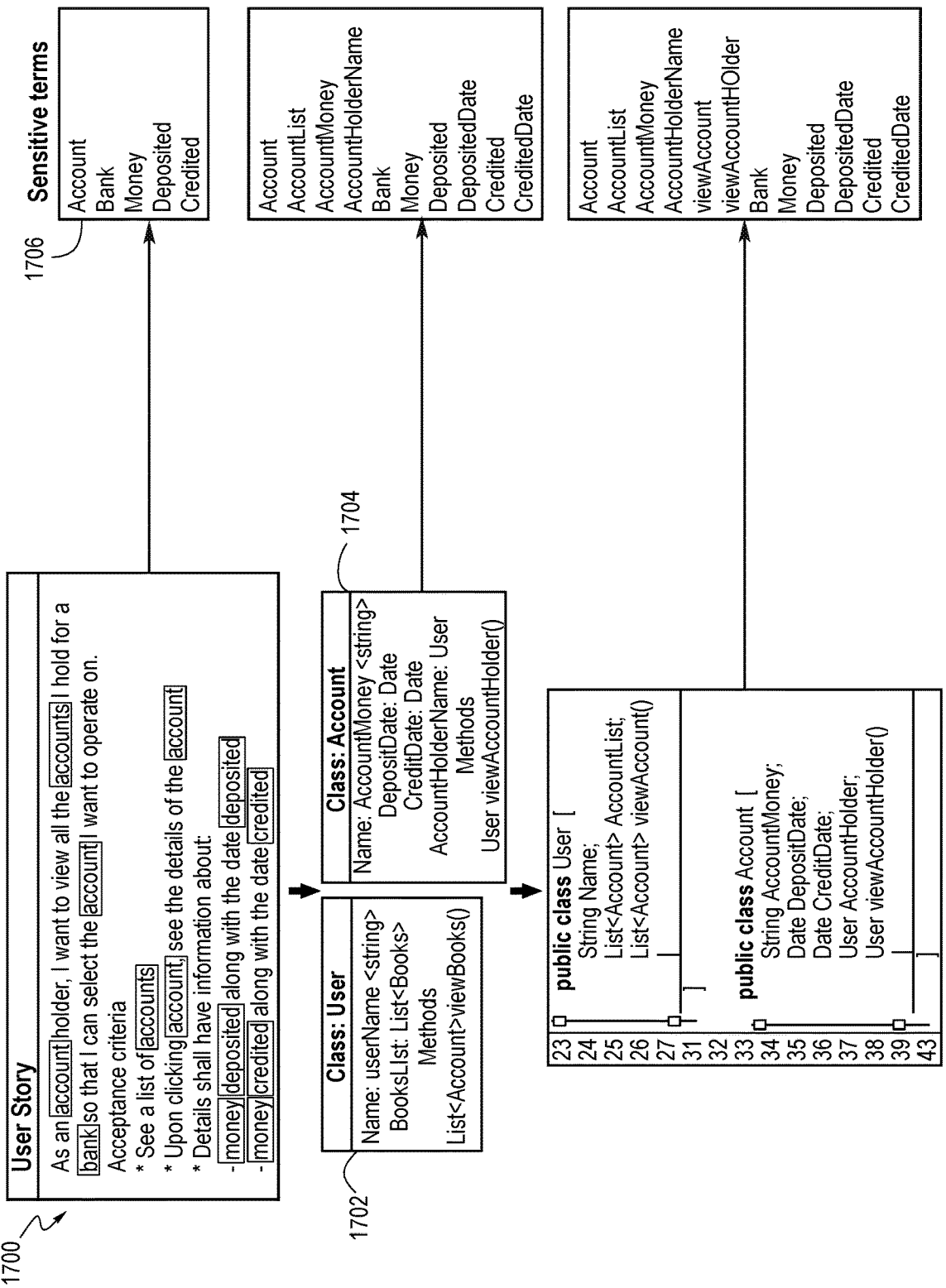
FIG. 17 shows an example of artifact creation.

FIG. 17 illustrates an example of artifact creation and evolution of sensitive terms. Referring to FIG. 17, a user story 1700 for a financial application is assigned to a worker for designing the required classes and the work product of the task is a class diagram. The sensitive entities 1706 in the user story 1700 are account, money, deposited, credited, and bank. The terms account, bank, and money are directly related to a financial account management system whereas the terms deposited and credited are indirectly related to a financial account management. If the user story 1700 were to be shared with a worker without any change, it would reveal information about the domain of the application.

A class diagram, created for this user story will have classes User 1702 and Account 1704 with fields that include either short forms of these terms or a composition of the sensitive terms 1706 with other terms as shown in FIG. 1 on the right hand side. For instance with the term "Account," the TTA 112 may create the terms AccountHolderName, AccountList, and AccountMoney. Any terms that contain a sensitive term, its short form, or a semantically similar term may be treated as a sensitive term in the software development artifact. The class diagram may be used further for development, and additional sensitive terms may be introduced in the form of variable names, function name, and so on as shown in FIG. 17.

The TTA 112 may begin its processing with a confidentiality definition phase. The operator may configure a definition for sensitive terms in the confidentiality configuration phase via a graphical user interface or other input method. As confidential information may be defined in several forms, the TTA 112 may accept and store the following configuration data during the confidentiality configuration phase, and may retrieve and utilize the configured confidentiality parameters for tasks in further phases. Some examples of confidentiality configuration parameters include:

1) Domain of application: the domain of a software application may imply a business domain in which the software application may be used. For instance banking, healthcare, and so on.

2) Market: a market may imply the market for which the application is being built, such as a market within a geographic area, a social segment, and so on. For instance, an application being built for a Japanese market may have certain terms that strongly relate to or identify a market in Japan that may need be identified and protected.

3) Presence of a proprietary algorithm: the application may include proprietary methods or algorithms that may need to be identified and protected.

In some embodiments, the TTA 112 may implement a three stage processing pipeline including: risk assessment, outbound transformation, and inbound transformation. The TTA 112 may execute the three stages as part of assigning a task to an external worker and/or posting it to an external worker as described above. In that regard, the TTA 112 may implement the processing described below in Algorithm 1 for posting and/or assigning a task.

First, the TTA 112 may assess task artifacts to determine a risk metric, e.g., as shown in Table 2, Algorithm 2. The risk assessment may involve detection of sensitive terms in the artifact. The TTA 112 may apply source ontologies, e.g., the ontologies of domain and market, to assess the risk. The TTA 112 may detect sensitive terms responsive to information content (IC) of each word in the artifact. The IC may provide a measure how much information a particular word reveals in a given text. In that regard, the TTA 112 may identify the noun phrases in the artifact that belong to a source domain ontology and may mark the identified noun phrases as sensitive. Next, the TTA 112 may identify words with information content above a threshold and mark them sensitive. Lastly, the TTA 112 may find terms that mutually correlate with the sensitive terms. For instance, in the user story 1700 shown in FIG. 17, the terms account and deposited are mutually correlated. Therefore, if the term "account" is marked as sensitive then the TTA 112 also marks "deposited" as sensitive. The mutual correlation between terms is identified with Pointwise Mutual Information (PMI), as a measure. The risk assessment algorithm uses the sensitive terms identified by the above steps to calculate the overall risk metric for posting the artifact without execution of any sanitization operations.

If the TTA 112 assesses the artifact as "risky to post," it may execute a sanitization process where sensitive terms may be replaced with non-sensitive terms, e.g., as shown in Table 3, Algorithm 3. The TTA 112 may execute several different kinds of operations to sanitize a term. Some exemplary TTA 112 sanitization operations include:

1. Generalization: in which a term is replaced with a more general term,

2. Term Replacement: in which a term in a source domain is replaced with a term in target domain.

3. Domain Replacement: in which source domain is replaced with a target domain. The TTA 112 may first identify a subgraph of the sensitive term in the source domain ontology and searches an equivalent subgraph in the target domain ontology. The subgraph search helps to ensure that the task description is consistent.

Once the TTA 112 executes transformation operations on the artifact, the task may be stored or distributed for further processing. For example, in a crowd sourcing system the artifact may be posted via the Internet for access by one or more users or "crowd workers." Upon receiving a work product from a user or "crowd worker," the TTA 112 may execute inbound transformation again to transform the work product to conform with the original terminology, e.g., as shown in Table 4, Algorithm 4. In this regard, the TTA 112 may execute a transformation or de-sanitization dictionary that maps sensitive terms to their respective replacement terms that may have been used during the outbound transformation process. The inbound transformation dictionary may evolve and grow as new terms may be introduced in each phase. The inbound transformation dictionary may be updated each time a worker submits his or her work. For example, the TTA 112 may update the inbound transformation dictionary as shown in Table 5, Algorithm 5. Algorithm 5 parses new terms or noun phrases in a completed task or work product, in to substrings and searches for the substring in the dictionary. If they are found, then mapping may be executed for the substrings. A mapped substring may be used for replacing the substring in the term. For instance term BookList has two substrings Book and List. Suppose there is mapping available for Book as Account, then a new mapping may be created in a de-sanitization dictionary that maps the term BookList to AccountList. In some instances, a transformation process or transformation dictionary may be referred to as a translation process or translation dictionary. The above transformation process is not only to related to simple replacement of terms but also other operations and assures that the transformation does not create any consistency in the description.

TABLE 1

Algorithm 1: Confidentiality -Safe Task Posting

Input: Task Artifact, Confidentiality Configuration
Output: Sanitized Artifact
Begin
    Risk metric ← AssessRisk(Task Artifact, Confidentiality
    Configuration)
    If Risk metric > Threshold
        SanitizedArtifact ← Sanitize Artifact(Artifact)
        Post task description with Sanitized Artifact
End

TABLE 2

Algorithm 2: Risk Assessment

Input: Artifact, Source domain ontology
Output: Risk factor for the artifact
Begin TABLE 2-continued Algorithm 2: Risk Assessment Parse artifact to extract words and identify Noun Phrases
For each noun phrase np
Begin
  If np is present in Source domain ontology
    Tag np as sensitive
  Else
    Compute Information content for np
  End
  Threshold←Minimum Information Content of all the sensitive words
  For all Noun Phrases, onp , that do not belong to domain ontology
    Begin
      If InformationContent(onp) > Threshold
        Tag onp as sensitive
    End
  For all noun phases, mp, that mutually correlate with any sensitive term
    Mark rnp as sensitive
  Calculate Risk factor for the artifact as follows
  Risk Factor = $\frac{1}{N}\sum_{\forall t_s \in T_s} p(t_s) \cdot \log(p(t_s))$ // $T_s$ is the list of sensitive terms
End

TABLE 3

Algorithm 3: Sanitize Artifact

Input: Artifact, Source Ontology, Target Ontology
Output: Sanitized artifact
Begin
  Sensitive Terms ← Sensitive Term Detection (Artifact, Source Ontology)
  For each sensitive term st
    Replace st with either of the following replacement terms
      rt ← Generilize(st)
      rt ← Find target Domain Term(st, Target Ontology)
End

TABLE 4

Algorithm 4: De-Sanitize Artifact

Input: Artifact, De-sanitization Dictionary
Output: De-sanitized artifact
Begin
  For each sanitized term st in the artifact
    Get a de-sanitized dt term from De-sanitization dictionary
    Replace st with dt
End

TABLE 5

Algorithm 5: Update De-sanitization dictionary

Figure 18:
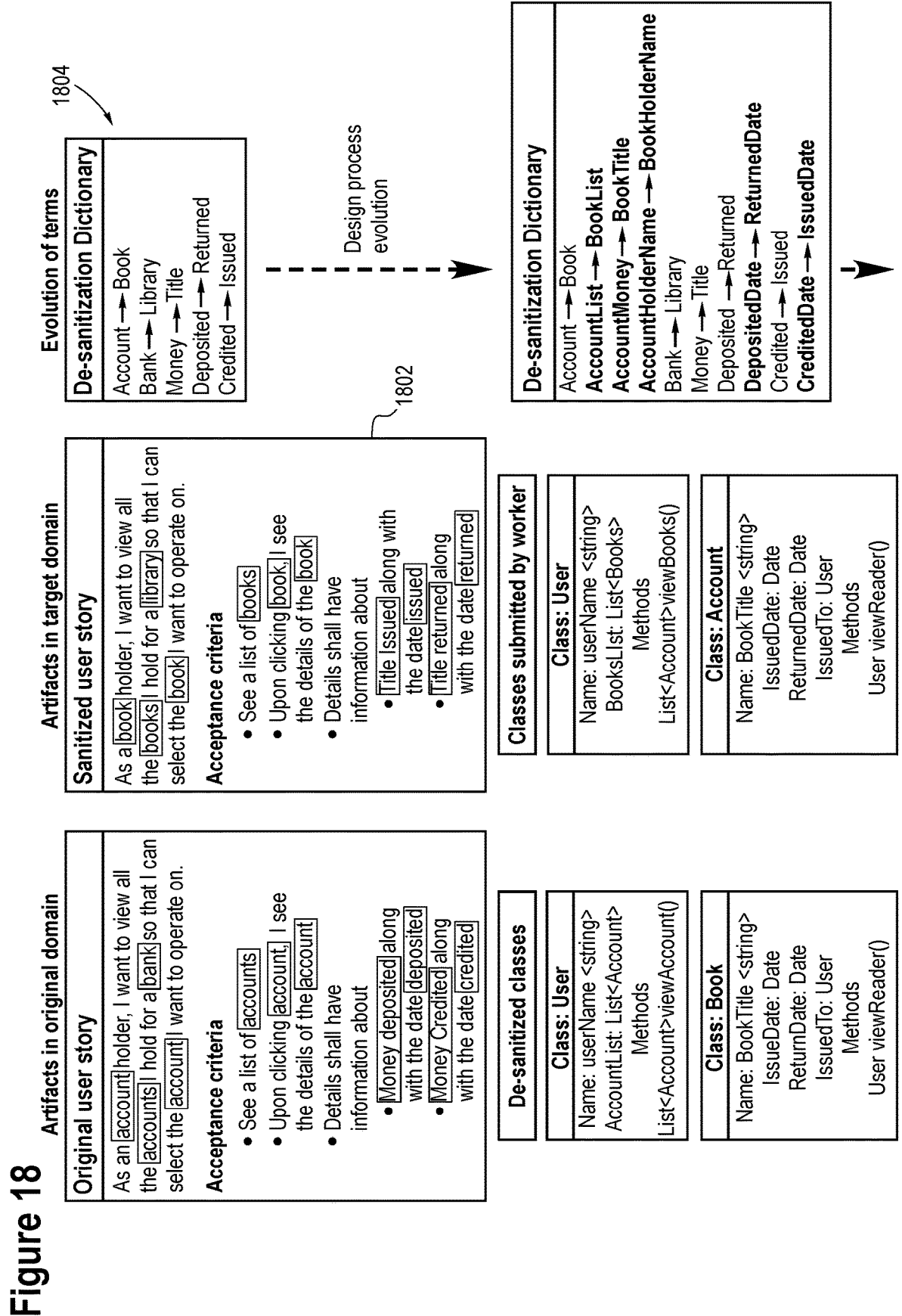

Input: Artifact, De-Sanitization dictionary
Output: Updated De-Sanitization dictionary
Begin
  For each term t in Artifact
    Begin
  If Sanitization dictionary does not contain term t
    Identify substrings of t that are present in Dictionary
    Replace the substrings with mapping as per Dictionary
  Else         // If substrings do not appear in dictionary,
    Identify semantically similar term
    Create a mapping of term in De-sanitization dictionary
End As a specific example, consider an original user story as an artifact for a bank account management system as shown in FIGS. 18 and 19. The source domain of the original artifact is the banking domain. The banking domain may have been configured by an operator during the confidentiality definition phase. Assume that the operator wants to post a sanitized design task for the given user story. The operator may input instructions to the TTA 112 to execute a risk assessment operation on the user store data. The risk assessment may be executed based on domain ontology data that is configured for financial banking applications. As there may be several sensitive terms present in the user story that belong to the financial banking ontology, the TTA 112 may flag the sensitive terms within the user story as "too risky" to post to a user or worker. Next, the TTA 112 may execute a transformation step in which the sensitive terms of the original user story may be replaced with substitution terms from a target domain, and output a sanitized user story in the target domain. In one instance, a "library management" domain may be configured or determined by the TTA 112 to be the target domain. FIG. 18 shows the transformed user story 1802 in which the original sensitive terms are replaced with terms from the library management domain.

FIGS. 18 and 19 illustrate the evolution of an inbound transformation (de-sanitization) dictionary 1804. An external worker may receive the transformed task expressed in the library management target domain's terms and may create a work product, for example, a class design with terms that belong to the target domain. In addition, the work product may include newly introduced terms, such as "Booklist," as shown in FIG. 18. The TTA 112 may identify substrings of the newly introduced term that are present in the inbound dictionary, and may replace the substrings with mappings from the inbound dictionary. For example, the TTA 112 may create the term "AccountList" using the substrings "Account" and "List" from the inbound dictionary and map the term "AccountList" to the newly introduced target domain term "BookList."

The TTA 112 may then transform the submitted class design completed task with terms from the source domain and the newly created terms, which are mapped in the inbound transformation dictionary. FIG. 19 also shows an example of a codebase 1902 submitted by crowd worker and a translated or de-anonymized version of the codebase 1904.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
at task assessment circuitry:
   obtaining a task definition of a source domain, the task definition comprising a task element;
   implementing task assessment instructions by:
      determining a risk metric for the task element by:
         performing a stemmization-based natural language processing search of the task element by executing queries including:
         a pre-defined sensitive word;
         a specific noun phrase; or
         any combination of the foregoing
         accessing a risk metric parameter stored in memory; and
         based on searching the task element and the risk metric parameter, assigning a risk metric to the task element;
   when the risk metric exceeds a pre-defined confidentiality risk threshold:
      at transformation circuitry:
         implementing outbound transformation instructions by:
            transforming the task element into a revised form from a target domain, the transformed task element having a reduced risk metric by:
               accessing a mapping table to interrelate to lookup a first replacement rule by referencing the queries, the mapping table configured to provide a ruleset for translating the task element into an anonymized form;
               applying the first replacement rule defined in the mapping table, the replacement rule defining a new context for the target domain by which a nature of the task element for the source domain is hidden;
               searching the task element for a term inconsistent with the new context;
               applying a second replacement rule defined in the mapping table, the second replacement rule defining a substitution for the term; and
               replacing the task element with the revised form of the target domain to obtain a transformed task of the target domain; and
      via a user interface generated using machine interface instructions, receiving a command to post the task definition;
      receiving a completion indication associated with the task definition; and
      after receiving the completion indication, at the task transformation circuitry, implementing inbound transformation instructions by applying a refactoring tool to de-anonymize the task definition to re-expose the nature of the task element for the source domain.

2. The method of claim 1, further comprising:
posting the transformed task of the target domain for external workers.

3. The method of claim 1, where:
determining the risk metric comprises identifying a specific noun phrase in the task element and determining if the specific noun phrase is present in a source ontology.

4. The method of claim 3, further comprising:
identifying an additional noun phrase correlated to the specific noun phrase, and including the additional noun phrase in determining the risk metric.

5. The method of claim 1, where:
transforming comprises:
obtaining a domain substitution from an outbound transformation dictionary held within the mapping table.

6. The method of claim 5, where:
the outbound transformation dictionary maps the source domain for which the word and phrase substitution is applicable to the target domain.

7. The method of claim 1, where:
the completed indication includes a completed task element.

8. The method of claim 7, where:
applying a refactoring tool to de-anonymize the task definition includes obtaining a domain substitution from an inbound transformation dictionary.

9. A system including:
task assessment circuitry configured to:
   obtain a task definition of a source domain, the task definition comprising a task element;
   implement task assessment instructions by:
      determining a risk metric for the task element by:
         performing a stemmization-based natural language processing search of the task element by executing queries including:
         a pre-defined sensitive word;
         a specific noun phrase; or
         any combination of the foregoing
         accessing a risk metric parameter stored in memory; and
         based on searching the task element and the risk metric parameter, assigning a risk metric to the task element;
transformation circuitry configured to:
   implement outbound transformation instructions by:
      when the risk metric exceeds a pre-defined confidentiality risk threshold:
         transforming the task element into a revised form from a target domain, the transformed task element having a reduced risk metric by:
            accessing a mapping table to interrelate to lookup a first replacement rule by referencing the queries, the mapping table configured to provide a ruleset for translating the task element into an anonymized form;
applying the first replacement rule defined in the mapping table, the replacement rule defining a new context for the target domain by which a nature of the task element for the source domain is hidden;
searching the task element for a term inconsistent with the new context;
applying a second replacement rule defined in the mapping table, the second replacement rule defining a substitution for the term; and
replacing the task element with the revised form of the target domain to obtain a transformed task of the target domain; and
via a user interface generated using machine interface instructions, receive a command to post the task definition;
receive a completion indication associated with the task definition; and
after receiving the completion indication, implement inbound transformation instructions by applying a refactoring tool to de-anonymize the task definition to re-expose the nature of the task element for the source domain.

10. The system of claim 9, where the task transformation circuitry is further configured to cause the transformed task of the target domain to be posted for external workers.

11. The system of claim 9, where the task assessment circuitry is further configured to determine the risk metric by identifying a specific noun phrase in the task element and determining if the specific noun phrase is present in a source ontology.

12. The system of claim 11, where the task assessment circuitry is further configured to determine the risk metric by identifying an additional noun phrase correlated to the specific noun phrase, and including the additional noun phrase.

13. The system of claim 9, where the task transformation circuitry is further configured to transform the task element by further obtaining a domain substitution from an outbound transformation dictionary held within the mapping table.

14. The system of claim 13, where:
the outbound transformation dictionary maps the source domain for which the word and phrase substitution is applicable to the target domain.

15. The system of claim 9, where the completed indication includes a completed task element.

16. The system of claim 15, where the task transformation circuitry is further configured to apply a refactoring tool to de-anonymize the task definition by obtaining a domain substitution from an inbound transformation dictionary.

17. A product including:
non-transitory machine-readable media; and
instructions stored on the machine-readable media, the instructions, when executed, configured to cause a machine to:
at task assessment circuitry:
obtain a task definition of a source domain, the task definition comprising a task element;
implement task assessment instructions by:
determining a risk metric for the task element by:
performing a stemmization-based natural language processing search of the task element by executing queries including:
a pre-defined sensitive word;
a specific noun phrase; or
any combination of the foregoing
accessing a risk metric parameter stored in memory; and
based on searching the task element and the risk metric parameter, assigning a risk metric to the task element;
at transformation circuitry:
implement outbound transformation instructions by:
when the risk metric exceeds a pre-defined confidentiality risk threshold:
transforming the task element into a revised form from a target domain, the transformed task element having a reduced risk metric by:
accessing a mapping table to interrelate to lookup a first replacement rule by referencing the queries, the mapping table configured to provide a ruleset for translating the task element into an anonymized form;
applying the first replacement rule defined in the mapping table, the replacement rule defining a new context for the target domain by which a nature of the task element for the source domain is hidden;
searching the task element for a term inconsistent with the new context;
applying a second replacement rule defined in the mapping table, the second replacement rule defining a substitution for the term; and
replacing the task element with the revised form of the target domain to obtain a transformed task of the target domain; and
via a user interface generated using machine interface instructions, receive a command to post the task definition;
receive a completion indication associated with the task definition; and
after receiving the completion indication, implement inbound transformation instructions by applying a refactoring tool to de-anonymize the task definition to re-expose the nature of the task element for the source domain.

18. The product of claim 17, where the instructions are further configured to cause the machine to post transformed task to the target domain for external workers.

19. The product of claim 17, where the instructions are further configured to cause the machine to determine the risk metric by identifying a specific noun phrase in the task element and determining if the specific noun phrase is present in a source ontology.

20. The product of claim 19, where the instructions are further configured to cause the machine to determine the risk metric by identifying an additional noun phrase correlated to the specific noun phrase, and including the additional noun phrase.

* * * * *